(12) United States Patent
Gray et al.

(10) Patent No.: US 10,504,513 B1
(45) Date of Patent: Dec. 10, 2019

(54) NATURAL LANGUAGE UNDERSTANDING WITH AFFILIATED DEVICES

(71) Applicant: AMAZON TECHNOLOGIES, INC., Seattle, WA (US)

(72) Inventors: Timothy Thomas Gray, Seattle, WA (US); Michal Grzegorz Kurpanik, Bytow (PL); Jenny Toi Wah Lam, Bainbridge Island, WA (US); Sarveshwar Nigam, Yorba Linda, CA (US); Shirin Saleem, Belmont, MA (US); Jonhenry A. Righter, Mountlake Terrace, WA (US); Jeremy Richard Hill, Seattle, WA (US); Kavya Ravikumar, Mercer Island, WA (US); Joe Virgil Fernandez, Seattle, WA (US); Kynan Dylan Antos, Seattle, WA (US); Kelly James Vanee, Shoreline, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/716,353

(22) Filed: Sep. 26, 2017

(51) Int. Cl.
*G10L 15/22* (2006.01)
*G10L 15/02* (2006.01)
(Continued)

(52) U.S. Cl.
CPC .............. *G10L 15/22* (2013.01); *G10L 15/02* (2013.01); *G10L 15/1815* (2013.01);
(Continued)

(58) Field of Classification Search
CPC ......... G10L 15/00; G10L 15/22; G10L 15/26; G10L 15/265
See application file for complete search history.

(56) References Cited

U.S. PATENT DOCUMENTS 9,324,323 B1 4/2016 Bikel et al.
9,338,493 B2 5/2016 Van Os et al.
(Continued)

OTHER PUBLICATIONS

Blankenagel, Bryan S., "Non-Final Office Action dated Jun. 22, 2018", U.S. Appl. No. 15/587,187, The United States Patent and Trademark Office, filed Jun. 22, 2018.
(Continued)

*Primary Examiner* — Paras D Shah
(74) *Attorney, Agent, or Firm* — Lindauer Law, PLLC

(57) ABSTRACT

A dock device connects participating devices such as a tablet device and an audio activated device, allowing them to operate as a single device. These participating devices may be associated with different accounts, each account being associated with particular "speechlets" or data processing functions. A natural language understanding (NLU) system uses NLU models to process text obtained from an automatic speech recognition (ASR) system to determine a set of possible intents. A second set of possible intents may then be generated that is limited to those possible intents that correspond to the speechlets associated with the docked device. The intents within the second set of possible intents are ranked, and the highest ranked intent may be deemed to be the intent of the user. Command data corresponding to the highest ranked intent may be generated and used to perform the action associated with that intent.

21 Claims, 8 Drawing Sheets

(51) Int. Cl.
  *G10L 15/18* (2013.01)
  *G10L 15/30* (2013.01)
  *G10L 15/08* (2006.01)
  *G10L 17/00* (2013.01)

(52) U.S. Cl.
  CPC ............ *G10L 15/30* (2013.01); *G10L 17/005* (2013.01); *G10L 2015/088* (2013.01); *G10L 2015/223* (2013.01)

(56) References Cited

U.S. PATENT DOCUMENTS

| | | | | |
|---|---|---|---|---|
| 9,378,740 | B1* | 6/2016 | Rosen | G10L 15/18 |
| 9,392,324 | B1* | 7/2016 | Maltar | G06F 16/48 |
| 9,679,561 | B2* | 6/2017 | Bangalore | G10L 15/183 |
| 2006/0074670 | A1 | 4/2006 | Weng et al. | |
| 2007/0294081 | A1* | 12/2007 | Wang | G10L 15/26 704/200 |
| 2011/0112921 | A1 | 5/2011 | Kennewick et al. | |
| 2011/0223893 | A1* | 9/2011 | Lau | G10L 15/22 455/414.1 |
| 2012/0034904 | A1* | 2/2012 | LeBeau | G10L 15/265 455/414.1 |
| 2014/0163959 | A1 | 6/2014 | Hebert et al. | |
| 2014/0244259 | A1* | 8/2014 | Rosario | G10L 15/19 704/254 |
| 2014/0343946 | A1 | 11/2014 | Torok et al. | |
| 2014/0361973 | A1 | 12/2014 | Raux et al. | |
| 2015/0348551 | A1 | 12/2015 | Gruber et al. | |
| 2016/0259779 | A1 | 9/2016 | Labský et al. | |
| 2016/0322044 | A1* | 11/2016 | Jung | G06F 3/017 |
| 2016/0379629 | A1* | 12/2016 | Hofer | G06F 17/277 704/257 |
| 2017/0032783 | A1* | 2/2017 | Lord | G10L 15/22 |
| 2017/0236512 | A1* | 8/2017 | Williams | G10L 15/22 381/79 |
| 2017/0323016 | A1 | 11/2017 | Feng et al. | |
| 2017/0358305 | A1* | 12/2017 | Kudurshian | G10L 13/02 |
| 2017/0365253 | A1* | 12/2017 | Bradford | G10L 15/18 |
| 2018/0032902 | A1* | 2/2018 | Krishnan | G06N 99/005 |
| 2018/0090143 | A1 | 3/2018 | Saddler et al. | |
| 2018/0096690 | A1* | 4/2018 | Mixter | G10L 15/08 |
| 2018/0160463 | A1* | 6/2018 | Huttunen | G06F 3/12 |

OTHER PUBLICATIONS

Blankenagel, Bryan S., "Advisory Action dated Feb. 28, 2019", U.S. Appl. No. 15/587,187, The United States Patent and Trademark Office, filed Feb. 28, 2019.

Blankenagel, Bryan S., "Final Office Action dated Dec. 17, 2018", U.S. Appl. No. 15/587,187, The United States Patent and Trademark Office, filed Dec. 17, 2018.

* cited by examiner

NATURAL LANGUAGE UNDERSTANDING WITH AFFILIATED DEVICES

BACKGROUND

Natural language understanding (NLU) systems afford users with significant convenience and flexibility in interacting with various devices. Such interactions may include control of those devices.

Figure 1:
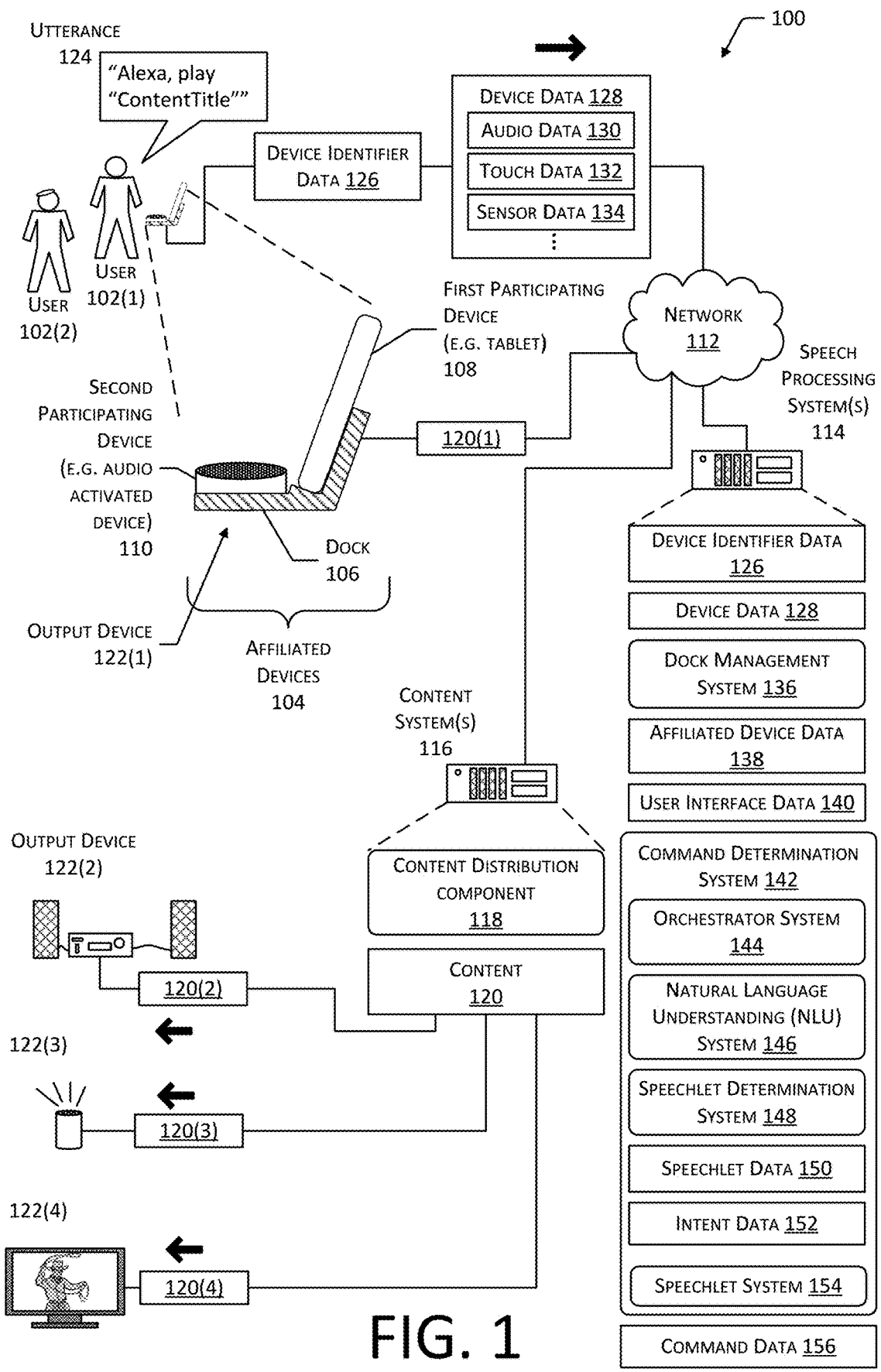
FIG. 1 depicts a system including a command determination system that utilizes affiliated devices to receive audio and a natural language understanding (NLU) system to generate command data from that input, according to one implementation.

Certain embodiments will now be more fully below with reference to the accompanying figures, in which various aspects are shown. However, various aspects may be implemented in many different forms and should not be construed as limited to the implementations set forth herein. Like reference numbers refer to like elements throughout.

DETAILED DESCRIPTION

Users appreciate the convenience of using spoken commands to control various systems. For example, users may speak aloud and have a set-top-box (STB) or other device respond to that utterance.

One or more devices may be used to detect that utterance and produce audio data, provide output to the user, or both. For example, an audio activated device may be used to generate the audio data representative of the utterance of the user. The utterance of the user may include a wakeword or phrase. The wakeword may be used to signal the system that the user is addressing the system. For example, the wakeword "Alexa" may cause an audio activated device to begin sending audio to a speech processing system.

An output device, such as a set-top-box (STB), network enabled television, tablet, mobile phone, automobile head unit, network enabled speaker, and so forth may be used to present content or other information. The presentation, or control thereof, may be responsive to the utterance. For example, the speech of the user may be acquired using the audio activated device and sent to one or more servers that execute a command determination system. The command determination system may then generate control data that is used to present content using the STB.

Participating devices may be joined together with a dock to produce affiliated devices. For example, an audio activated device and a tablet may be placed into the same dock and may be operated in conjunction with one another to provide combined functionality. The dock provides a chassis that physically connects the participating devices. In some implementations, the dock may provide for physical engagement with one or both participating devices. For example, latches, magnets or other features may be used to affix the participating devices to the chassis. The dock may provide other functionality as well, such as providing electrical power to the participating devices, a communication interface or bus to allow communication between the participating devices, and so forth. For example, the dock may provide a universal serial bus (USB) connection between the participating devices.

The operation of the affiliated devices may include functions that are not otherwise available to the individual participating devices operating independently of one another. For example, the audio activated device may include a speaker for output and for input and has a far-field microphone array that is able to acquire audio of a user speaking at a distance, while the tablet includes a display and a touch screen but a microphone that is not well suited for acquiring audio from the user at a distance.

Operation of the participating devices may be coordinated by one or both of the participating devices when in the dock, by an external device (such as a server or other remote processing device), or a combination thereof. In one implementation, one participating device may act as a master while the other acts as a slave. For example, the tablet may assert control of the audio activated device using the communication interface. Audio data from the audio activated device may be passed along the communication interface to the tablet, which may then send the audio data to an external speech processing system. Audio output may be received by the tablet and sent via the communication interface to the audio activated device for presentation.

A dock management system may coordinate the operation of the participating devices. For example, the dock management system may receive dock identifiers from both participating devices and compare the two. If those dock identifiers match, the two participating devices may be deemed to be docked. Other techniques may be used to determine if participating devices are connected to the same dock, such as sending data across a wired interface in the dock.

The dock management system may coordinate the transfer of data between the participating devices and supporting systems. For example, the dock management system may direct video output to a tablet device in the dock while audio output is directed to the audio activated device. In another example, the dock management system may direct input from the participating devices to one or more supporting systems.

The supporting systems, such as speech processing systems, content systems, and so forth may recognize the affiliated devices as if they were another device. For example, the affiliated devices that comprise an audio activated device and a tablet may be configured to be recognized as if they were a single standalone device that includes a far-field microphone array, speaker, a display, and a touchscreen. These supporting systems may then interact with the affiliated devices as they would with the standalone device. In some implementations, the affiliated devices may provide information identifying them as the same type as the standalone device. For example, the affiliated devices may send device data that is representative of the standalone device. In one implementation, the dock management system may operate as an intermediary, presenting the affiliated devices as a single device to the supporting systems while coordinating operation of the participating devices and directing data to and from those participating devices.

User interface data may be provided by the supporting systems to the participating devices of the affiliated devices during operation. For example, during operation of the affiliated devices, a server may send the tablet device instructions to present graphical user interface elements on a display while the server sends the audio activated device instructions to present an audible user interface.

A speech processing system may process audio data representative of an utterance of the user using a variety of systems. Audio data representative of the utterance may be processed using an automatic speech recognition (ASR) system and natural language understanding (NLU) system. The ASR may provide functionality such as speech-to-text (STT). For example, the ASR may provide text data that is at least a portion of a transcript of the utterance of the user. The NLU system then processes this text data to determine possible intent(s) of the utterance. In other implementations, other types of input data may be acquired. For example, text input, touch input, gestural input, and so forth may be acquired. This input may be processed to determine text data which is then processed by the NLU system.

Processing of the possible intents may use information about speechlets associated with particular user account(s). A speechlet comprises a speech-enabled service that provides one or more particular data processing functions that are accessible to the user account associated with the user. The data processing functions may include, but are not limited to, data storage, data retrieval, calculation, and so forth. The speechlet may be executed locally, or on one or more servers. For example, a speechlet may provide, responsive to input, weather reports, access to a music streaming service, control over home automation devices, and so forth. The possible intents that the NLU has determined may be filtered to remove those that are not associated with a speechlet for the user account associated with the user. The remaining possible intents may then be ranked, such as by a confidence value that is an indication of how correct that particular intent is deemed to be. A command may then be generated that is based on the remaining possible intent that has the highest confidence value. For example, the command may send a request to a music streaming service to play a particular song title.

In some implementations, a speechlet may be associated with a particular device. For example, the speechlet may comprise control of home automation devices. In this example, the speechlet may be associated with the dock. Continuing the example, when participating devices are added to the dock to become affiliated devices, the particular speechlet for control of home automation devices may be available to the user accounts associated with the users of those affiliated devices.

Utterances of one or more users may be received by the affiliated devices. For example, the far-field microphone array on the audio activated device in the dock may be used to receive the utterance of a user. Audio data representative of this utterance may be generated and then sent via a network to a speech processing system. The speech processing system may use ASR to determine the text of the utterance. An NLU system uses an NLU model to process the text to determine what the intent of the utterance is.

A particular NLU model is trained or otherwise configured to provide for operation within a particular set of intents and possible values that are associated with a particular problem domain. For example, an NLU model trained for operation with audio content will be designed to look for intents that are associated with presentation of audio content, titles of audio content, and so forth. In comparison, an NLU model trained for operation with video content will be designed to look for intents that are associated with presentation of video content, titles of video content, and so forth. In one example, the NLU model for audio may interpret the phrase "skip" as a command to skip to a next song, while the NLU model for video may interpret the phrase "skip" as a command to present a next chapter or segment in currently playing video content.

A particular NLU model may be associated with a particular device or device type. For example, an audio activated device may be associated with the NLU model trained for audio content while a tablet device may be associated with the NLU model trained for video content.

As described above, information about the speechlets associated with a particular user account may be used to determine the intent of the user. For example, the user's account may be associated with a speechlet such as an audio streaming service and a video streaming service, but not have any speechlets associated with gaming. The first set of possible intents from the NLU may be filtered, and a second set of possible intents may be produced that includes only those possible intents that are associated with speechlets. Continuing the example, the second set of possible intents would include only those intents that have corresponding speechlets, such as involving an audio streaming service and a video streaming service.

Other information may be associated with the speechlets. For example, the speechlet for an audio streaming service may include access to specific information about the user's account with that service, such as a catalog of songs accessible to that account. In some implementations, the determination of the second set of possible intents may be further filtered using this other information. For example, the second set of possible intents may include only those intents that refer to song titles that are in the user's catalog of accessible songs.

The participating devices of the affiliated devices may be associated with the same user account. For example, in Alice's home the first participating device and the second participating device may both be associated with Alice's user account. In this situation, audio input obtained by the affiliated devices may be processed using speechlets that are associated with Alice's user account. For example, the affiliated devices may be associated with speechlet data that comprises a merger of the speechlets for the respective participating devices. For example, the audio activated device may have a speechlet for an audio streaming service and the tablet may have a speechlet for a video streaming service. The second set of possible intents would include intents that correspond to the merged set of speechlets.

In some situations, a "mixed-use" scenario may take place in which the participating devices of the affiliated devices may be associated with different user accounts. For example, one participating device may be associated with Alice's user account while another participating device may be associated with Bob's user account. When the two participating devices are placed in the same dock, several different NLU models and speechlets may become applicable to the resulting affiliated devices.

One of more of the following techniques may be used alone or in conjunction with one another to process the audio data while in this mixed-use situation.

The NLU system may utilize the NLU models associated with the participating devices. For example, Alice's participating device may be associated with an audio NLU model, while Bob's participating device may be associated with a video NLU model. Both NLU models may be used by the NLU system to determine intents. NLU models may also be selected for devices that are associated with a user account or device. For example, a participating device may be associated with a STB. As a result, the NLU model associated with the STB may also be used to process the utterance. Some devices may be associated with particular accounts. The NLU models associated with these devices may also be used to process the utterance.

Various combinations of the associated speechlets may be merged and used. For example, the speechlet data indicative of the speechlets associated with the respective user accounts for the participating devices may be merged and used.

In some mixed-use scenarios, the speechlets associated with a particular user account may be used. For example, the speechlet that permits access to the largest number of content titles may be selected. In another example, the speechlets associated with the user account of the participating device that was first placed in the dock may be used. In yet another example, the speechlets associated with the user account for a particular participating device may be used. In still another example, a previously made selection may be used, such as a prior designation of the user account with the corresponding speechlets accessible to that user account.

In other implementations, when a mixed-use scenario occurs a user interface may be presented that asks for a user to make a selection. For example, the user interface may allow the user to pick a particular user account, or select one or more of the speechlets that are available for the user accounts.

Information about the identity of the user who is speaking may be used to determine the speechlets that are used to determine intent of the utterance. In one implementation, the user may utter a particular wakeword, passcode, or other utterance that is indicative of their identity. In another implementation, the audio data may be processed to determine an identity of a user speaking based on characteristics of the utterance, such as pitch, tempo, and so forth. Data from other sensors may also be used to determine the identity of the person speaking. For example, an image acquired by a camera of a participating device may be processed to recognize the user's appearance and determine the identity of the speaker. The identity of the person speaking may then be used to determine the speechlets associated with that person's user account.

Other information may also be used to determine the intent of the user. In one implementation, sensor data obtained from the participating devices may be used to determine the intent. For example, one of the participating devices may include a camera. An image from the camera may be processed to determine how many people are present in the image. Based on the number of people present, the set of speechlets used to filter the intents may be changed, particular intents may be disregarded, and so forth.

By using the systems and techniques described above, users may dock relatively inexpensive participating devices, resulting in affiliated devices that support greater functionality than the constituent. This improves the ability of users to re-use existing devices in new ways or produce affiliated devices with particular functionality that may be unavailable in a standalone device.

The techniques described also improve the operation of the system. For example, by using information about the speechlets to determine the intent, erroneous actions are minimized, reducing the use of computational resources that would otherwise be associated with retries, unwanted actions, and so forth.

In another example, performance is improved by allowing the same NLU model for a particular domain to be re-used across many users, with user account specific information handled by using the speechlet data. As a result, memory storage requirements for the system are reduced by minimizing the need to store multiple copies of user-specific NLU models. The use of computational resources is further minimized by reducing the need to maintain user-account specific NLU models across a large user base.

Illustrative System

FIG. 1 depicts a system 100 including affiliated devices that are in communication with a speech processing system. One or more users 102(1), 102(2), . . . , 102(U) may utilize affiliated devices 104. The affiliated devices 104 include a dock 106 which in turn is associated with a first participating device 108 and a second participating device 110.

The dock 106 provides a physical structure by which the participating devices may be supported. For example, the dock 106 may comprise a chassis which holds the first participating device 108 and the second participating device 110. In some implementations, the dock 106 may provide various functions. The dock 106 may provide electrical power to the first participating device 108 and the second participating device 110.

The dock 106 may include electrical wiring that allows wired connectivity between the participating devices. The dock 106 may include a communication interface such as a universal serial bus (USB) to allow for the participating devices to communicate with one another. In some implementations, the dock 106 may include a processor, input/output devices, and so forth.

While two participating devices are shown, in other implementations the dock 106 may support more than two participating devices.

For ease of illustration, not necessarily as a limitation, this disclosure may refer to the affiliated devices 104 as performing various actions or having particular features. The actions may be performed by one or more of the first participating device 108, the second participating device 110, or the dock 106. Likewise, the features may be present in one or more of the first participating device 108, the second participating device 110, or the dock 106. For example, a communication that involves "the affiliated devices 104" may utilize a communication interface of the first participating device 108.

The affiliated devices 104 may connect to a network 112. The affiliated devices 104 (or the participating devices) may use the network 112 to communicate with one or more of a speech processing system 114, a content system 116, or other systems.

The speech processing system 114 may include or operate in conjunction with the content system 116 or other systems. The content system 116 may include a content distribution component 118 that receives command data 156 and delivers at least a portion of content 120 using an output device. For example, the command data 156 may comprise instructions to present content 120 comprising a particular video title on one or more output devices 122.

The output devices 122 may include devices that are able to present output. For example, the affiliated devices 104 may act as an output device 122(1). In this illustration, some output devices 122 are shown. The output device 122(2) may be a network enabled sound system 122(2) that includes an amplifier, one or more speakers, and so forth. The sound system 122(2) may be used to present audio output, such as playing audiobooks, music, and so forth. The output device 122(3) may be a network enabled speaker 122(3) that is able to present audio output. The output device 122(4) may be a network-enabled television 122(4). For example, the television 122(4) may include a computer system to run applications such as a video player, music player, games, and so forth.

A user 102 may produce an utterance 124. For example, the user 102 may speak aloud "Alexa, play ContentTitle". The user 102, and possibly other users 102, may be near the affiliated devices 104. The affiliated devices 104 may be configured or configurable to accept input, provide output, and so forth. A participating device may act as an input device, an output device, or both. For example, the first participating device 108 may comprise a tablet that may be used to present video output while the second participating device 110 comprises an audio activated device with microphones that are able to receive audio input.

One or more of the participating devices may be able to be operated using audio input. For example, the first participating device 108 may include a microphone and is able to accept audio input. In another example, the second participating device 110 may be an audio activated device that is network enabled and comprises one or more microphones and a speaker. The audio activated device may be "headless" and omit a display device. The second participating device 110 may use the one or more microphones to detect the utterance 124 and provide audio data 130 that is representative of the utterance 124. The audio data 130 may be comprised of digitized audio, such as a pulse code modulated (PCM) representation of an analog signal obtained by the one or more microphones. In other examples, other data may be included with the audio data 130, such as a device identifier, timestamp, account identifier, location information, and so forth.

The affiliated devices 104 may send device identifier data 126 as well as device data 128 to the speech processing system 114. The device identifier data 126 comprises information that is indicative of one or more of the dock 106, the first participating device 108, or the second participating device 110. For example, the device identifier data 126 may comprise a media access control (MAC) address for the particular device. In some implementations, device identifier data 126 may include several pieces of information. For example, the device identifier data 126 sent by the first participating device 108 may include a MAC address of the first participating device 108 and a dock identifier received from the dock 106. Continuing the example, the device identifier data 126 sent by the second participating device 110 may include a MAC address of the second participating device 110 and the dock identifier also received from the dock 106.

The affiliated devices 104 may also send device data 128. The device data 128 may comprise data that has been acquired by or generated by a particular device. For example, one or more of the dock 106, the first participating device 108, or the second participating device 110 may generate device data 128. The device data 128 may comprise audio data 130, touch data 132, sensor data 134, or other data. As described above, the audio data 130 may comprise digitized audio that is representative of an analog signal obtained by one or more microphones. The touch data 132 may comprise information obtained from a touch sensor, such as a digitizer on a touchscreen. The sensor data 134 may comprise information obtained by other sensors, such as ambient light sensors, cameras, motion sensors, barometric pressure sensors, and so forth.

The speech processing system 114 or other system may include a dock management system 136. The dock management system 136 may provide various functions, including determining the participating devices of the affiliated devices 104. For example, the dock management system 136 may receive the device identifier data 126(1) from the first participating device 108 and the device identifier data 126(2) from the second participating device 110. If the dock identifier from the first device identifier data 126(1) matches the dock identifier from the second device identifier data 126(2), then the two devices may be deemed to be part of the same affiliated devices 104.

Other techniques may also be used to determine the participating devices of the affiliated devices 104. For example, the first participating device 108 and the second participating device 110 may be in communication with one another via a communication bus that is provided by the dock 106. By exchanging information via this communication bus, the participating devices may determine that they are connected to one another via the dock 106.

The dock management system 136 may coordinate operation of the first participating device 108 and the second participating device 110 during operation of the affiliated devices 104. For example, the dock management system 136 may be configured to direct video output to the participating device that includes a display while receiving audio output from the participating device with a suitable microphone array. In some implementations, the dock management system 136 may act as a proxy or intermediary system between the participating devices and other systems, such that the affiliated devices 104 appear as a single device.

The dock management system 136 may be configured to generate user interface data 140. The user interface data 140 may be used to present a user interface using one or more of the first participating device 108 or the second participating device 110. For example, the user interface data 140 may comprise commands such as hypertext markup language code that is designed to present a graphical user interface on a display when executed by a web browser application. Other systems may also generate user interface data 140 that is used to present a user interface on the affiliated devices 104. Input provided responsive to the user interface may then be obtained. For example, the user interface data 140 may present a list of options and input data indicative of those options selected to be returned to a requesting system.

The device identifier data 126 may be provided at particular time intervals, when there is a state change, responsive to a query from an external device, and so forth. For example, the affiliated devices 104 may send device identifier data 126 to the speech processing system 114 when a change in the attached participating devices is detected by the dock 106.

The speech processing system 114 comprises a command determination system 142. The command determination system 142 is configured to process an utterance 124 and may initiate an action responsive to the utterance 124.

The command determination system 142 may include an orchestrator system 144 that coordinates operation of the systems that comprise the command determination system 142. For example, the orchestrator system 144 may direct the audio data 130 of the utterance 124 obtained by one of the participating devices to an automated speech recognition (ASR) system, that returns text data. The orchestrator system 144 may then provide the text data to a natural language understanding (NLU) system 146.

An utterance 124 may be representative of an intent. The NLU system 146 may attempt to determine the intent in the utterance 124. The speechlet determination system 148 may generate speechlet data 150. The speechlet data 150 is indicative of one or more speechlets of a speechlet system 154 that are associated with a particular user account or device that is associated with the utterance 124. The speechlet system 154 may comprise a speech-enabled service that provides one or more particular data processing functions. For example, a speechlet system 154 (or "speechlet") may provide, responsive to input, a weather report, a uniform resource locator (URL) that provides access to a music streaming service, instructions to control home automation devices, and so forth. Output from a speechlet may be used to produce audible output such as computer-generated speech, visual output such as presented on a display, and so forth. Different speechlets may be provided by different services or service providers, or the same service may support multiple different speechlets. The speechlet data 150 comprises information, as described below, about the speechlets associated with the utterance 124.

The NLU system 146 may process text data of the utterance 124 to generate intent data 152, such as a first set of possible intents. The intents may have respective confidence values. The NLU system 146 may utilize NLU models to process the text data. A particular NLU model is trained or otherwise configured to provide for operation within a particular set of intents and possible values that are associated with a particular problem domain. For example, an NLU model trained for operation with audio content will be designed to look for intents that are associated with presentation of audio content, titles of audio content, and so forth. In comparison, an NLU model trained for operation with video content will be designed to look for intents that are associated with presentation of video content, titles of video content, and so forth. In one example, the NLU model for audio may interpret the phrase "skip" as a command to skip to a next song, while the NLU model for video may interpret the phrase "skip" as a command to present a next chapter or segment in currently playing video content.

A particular NLU model may be associated with a particular device or device type. For example, an audio activated device may be associated with the NLU model trained for audio content while a tablet device may be associated with the NLU model trained for video content. NLU models may be shared or otherwise used to process data from many users 102.

In some implementations NLU models may be specific to one or more of a particular region, particular language, particular accent, and so forth. For example, the American English NLU model for audio content may differ from the British English NLU model for audio content.

The speechlet data 150 from the speechlet determination system 148 may be used to determine the intent data 152. For example, the intent data 152 may comprise a subset of the first set of possible intents produced by the NLU system 146 that have been filtered using the speechlet data 150.

Each speechlet is associated with a particular functionality. For example, a speechlet that accesses an audio streaming service provides the functionality of accessing and retrieving a stream of audio from a content system 116 for presentation.

The second set of possible intents may comprise those intents that are associated with a speechlet in the speechlet data 150 while discarding those intents that are not associated with speechlets in the speechlet data 150. For example, an intent to play content using an audio streaming service would be associated with the speechlet that provides access to an audio streaming service. As a result, the second set of possible intents may be a subset of the first set of possible intents.

The speechlet may include user account specific information. For example, both user 102(1) and 102(2) may have enabled support for the same "Speechlet1" speechlet that provides access to an audio streaming service of that name. However, user 102(1) and user 102(2) may have different catalogs of content that they have access to, different access rights, and so forth that are specific to their individual user accounts with that service.

The second set of possible intents may be further filtered to exclude those intents having slots or variables that are not available to the user account. For example, if the utterance 124 is "play ContentTitle" and neither user account has rights to that song, the intents associated with playing the song "ContentTitle" using Speechlet1 would be omitted from the second set of possible intents.

The intents may have respective confidence values indicative of the likelihood that the particular intent is accurate. The second set of possible intents may be ranked or otherwise sorted by the confidence values. The intent in the second set of possible intents that has the highest confidence value may be deemed to be the intent expressed by the utterance 124. The highest ranked intent may then be processed by a speechlet system 154 that is used to generate command data 156. The speechlet system 154, in response to the highest ranked intent, provides particular functionality, such as generating command data 156 that includes a uniform resource locator (URL) to access content indicated by the highest ranked intent. The command data 156 may comprise one or more instructions that, when processed, initiate an action by an output device 122 or other device. For example, responsive to the utterance 124 of "play ContentTitle" the command data 156 may comprise an instruction to the Speechlet1 service to access the song titled "ContentTitle" using user 102(1)'s account and stream the song to the affiliated devices 104 for presentation.

The command data 156 may comprise tagged text, commands, and so forth. The command data 156 may then be sent to other services. For example, if the command data 156 includes a command to play music, the command data 156 may be sent to a music player application executing on an output device 122. If the command data 156 comprises a search request, the command data 156 may be sent to a search system. If the command data 156 includes a request for enablement of speechlet, the user account may be updated to include the NLU model for that speechlet.

In some situations, a "mixed-use" scenario may take place in which the participating devices of the affiliated devices 104 are associated with different user accounts. For example, the first participating device 108 is associated with the user account for user 102(1) "Alice" while the second participating device 110 is associated with user account for user 102(2) "Bob". When the two participating devices are placed in the same dock 106, several different NLU models and speechlets may become applicable to the resulting affiliated devices 104.

One or more of the following techniques may be used alone or in conjunction with one another to process the audio data 130 while in this mixed-use situation with participating devices associated with difference user accounts. With regard to the NLU models, the NLU system 146 may process the audio data 130 using the NLU models for both of the participating devices of the affiliated devices 104. In some implementations, the NLU system 146 may also process the audio data 130 using NLU models for other devices that are associated with the affiliated devices 104. For example, the second participating device 110 may comprise an audio activated device that is associated with the television 122(4). The television 122(4) is able to present video content and uses an NLU model trained for video content. As a result of the association between the second participating device 110 and the television 122(4), the second participating device 110 may be associated with the NLU model trained for video content.

As mentioned above, different user accounts may be associated with different speechlets. Various combinations of the associated speechlets may be merged and used. The speechlet determination system 148 may be used to generate speechlet data 150. For example, the speechlet data 150 indicative of the speechlets associated with the respective user accounts for the participating devices may be merged and used to process the intent data 152.

In some mixed-use scenarios, the speechlets associated with a particular user account may be used. For example, the user account having a speechlet that permits access to the largest number of content titles may be selected and used. In another example, the speechlets associated with the user account of the participating device that was first placed in the dock 106 may be used. In yet another example, the speechlets associated with the user account for a particular participating device may be used. In still another example, a previously made selection may be used, such as a prior designation of the user account with the corresponding speechlets accessible to that user account may be used to determine the intent data 152.

In other implementations when a mixed-use scenario occurs, a user interface may be presented that asks for a user 102 to make a selection. For example, user interface data 140 may be generated and sent to the affiliated devices 104 to present a user interface that enables the user 102 to pick a particular user account, or select one or more of the speechlets that are available for the user accounts.

Information about the identity of the user 102 who is speaking may be used to determine the speechlets that are used to determine the intent of the utterance 124. In one implementation, the user 102 may utter a particular wakeword, passcode, or other utterance that is indicative of their identity. In another implementation, the audio data 130 may be processed to determine an identity of the user 102 speaking based on characteristics of the utterance, such as pitch, tempo, and so forth. Data from other sensors may also be used to determine identity of the person speaking. For example, an image acquired by a camera of a participating device may be processed to recognize the user's 102 appearance and determine the identity of the speaker. The identity of the person speaking may then be used to determine the person's user account and the speechlets associated with that user account.

Other information may also be used to generate intent data 152. In one implementation, sensor data obtained from the participating devices may be used to determine the intent. For example, one of the participating devices may include a camera. An image from the camera may be processed to determine how many people are present in the image. Based on the number of people present, the set of speechlets used to filter the intents may be changed, particular intents may be disregarded, and so forth.

Operation of the command determination system 142 is described in more detail below, such as with regard to FIGS. 3 and 4.

Figure 2:
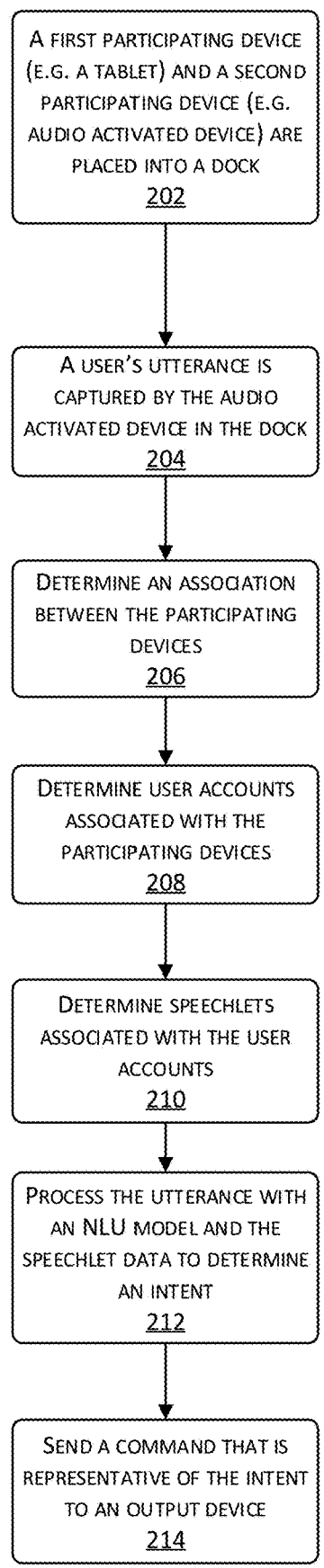
FIG. 2 depicts a scenario in which the operation of the NLU system used to determine an intent of an utterance is affected by the participating devices of the affiliated devices, according to one implementation.
Figure 2:
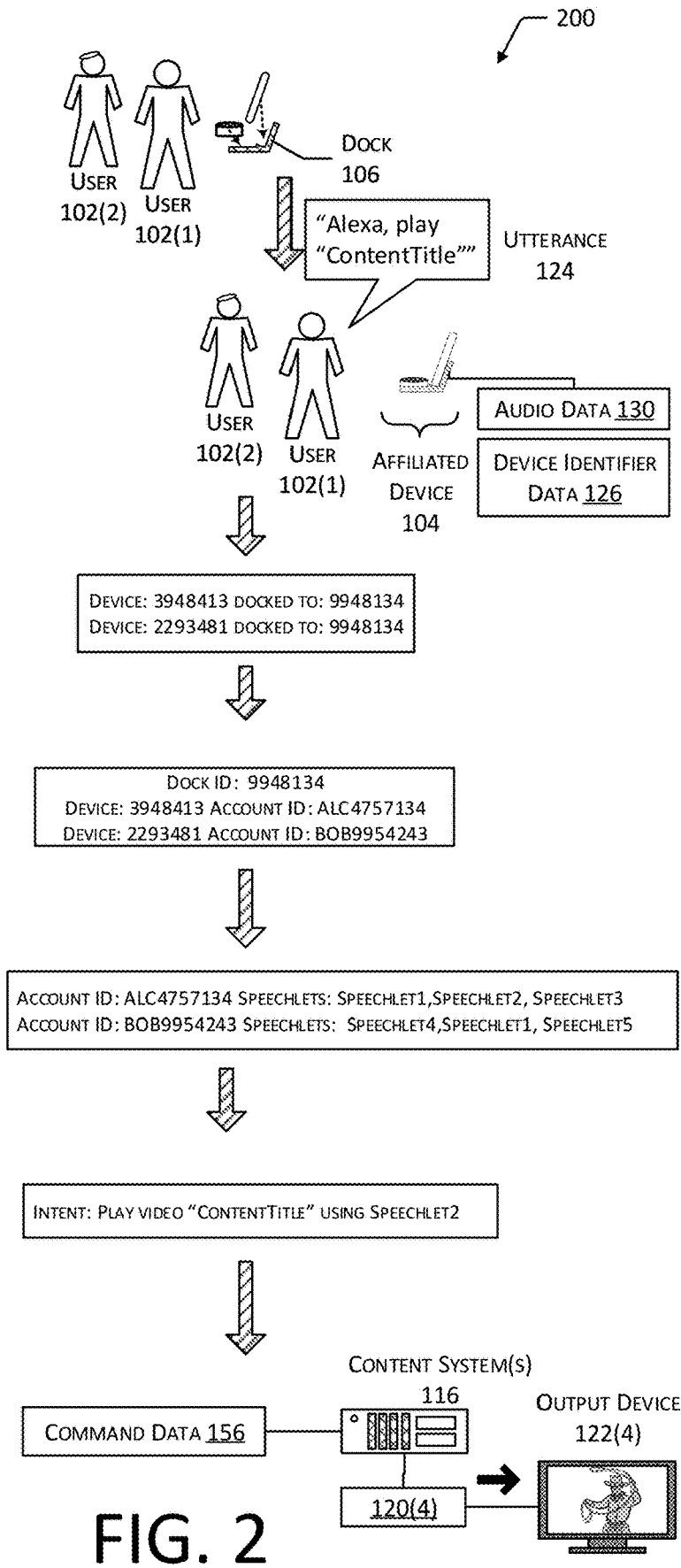

FIG. 2 depicts a scenario 200 in which the operation of the NLU system 146 used to determine an intent of an utterance 124 is affected by the participating devices of the affiliated devices 104, according to one implementation. As described above, in some implementations the affiliated devices 104 may comprise a first participating device 108 that is associated with the first user account and a second participating device 110 that is associate with a second user account. The first user account and the second user account may be associated with different sets of speechlets.

At 202, a first participating device 108 (such as a tablet) and a second participating device 110 (such as a voice-activated device) are placed into a dock 106. The two participating devices, so docked, now may be considered affiliated devices 104. For example, the connection between the dock 106 and the first participating device 108 may result in the first participating device 108 sending the device data 128 to the speech processing system 114. Continuing the example, the connection between the dock 106 and the second participating device 110 may result in the second participating device 110 sending the device data 128 to the speech processing system 114. The dock management system 136 may use the device data 128 from these participating devices to determine that they are affiliated devices 104.

At 204, the utterance 124 of the user 102 is captured by the voice-activated device. For example, the far-field microphone array of the voice-activated device may be used to detect the sound of the utterance 124 that is then processed to generate audio data 130 representative of the utterance 124.

At 206, an association is determined between the participating devices. For example, the dock management system 136 may analyze the device identifier data 126 and determine that the first participating device 108 and the second participating device 110 are both connected to the same dock 106.

At 208, the user accounts associated with the participating devices are determined. For example, the user account identifier associated with a particular device identifier as reported in the device identifier data 126 may be retrieved.

At 210, the speechlets associated with the user accounts are determined. For example, speechlet data 150 associated with one or more of the user accounts for the participating devices is determined. In one implementation, the speechlet data 150 may comprise a merger of the speechlets associated with the first user account and the speechlets associated with the second user account.

At 212, the utterance 124 is processed with an NLU model and the speechlet data 150 to determine the intent. For example, the intent data 152 may comprise possible intents that are associated with speechlets represented in the speechlet data 150. The intent associated with a speechlet in the speechlet data 150 and having the highest confidence value may be determined to be the intent of the utterance 124.

At 214, a command is sent that is representative of the intent to an output device 122. For example, the command data 156 may be sent to a content system 116 that begins presentation of content 120 using an output device 122 such as the affiliated devices 104.

Figure 3:
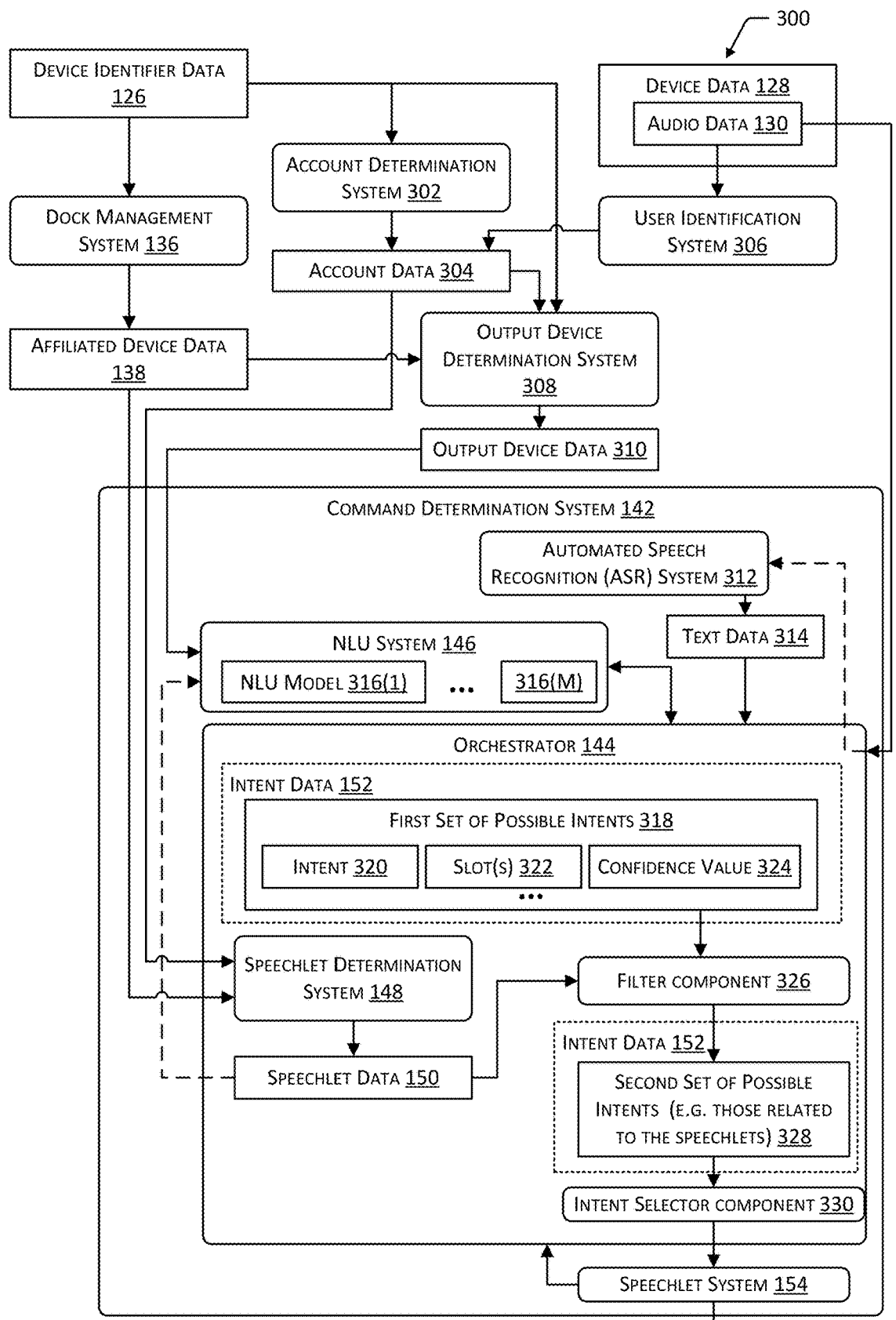
FIG. 3 illustrates a block diagram of the command determination system that determines an intent of an utterance and produces a command corresponding to that utterance, according to one implementation.

FIG. 3 illustrates a block diagram 300 of the speech processing system 114 including the command determination system 142 that determines an intent of an utterance 124 and produces a command corresponding to that utterance 124, according to one implementation.

An account determination system 302 is configured to generate account data 304. The account data 304 comprises information indicative of a particular user account that is associated with an utterance 124. In one implementation, the account determination system 302 may receive at least a portion of the device identifier data 126 that is indicative of the device identifier of one or more of the affiliated devices 104, the dock 106, the first participating device 108, or the second participating device 110. Based at least in part on the device identifier, an account identifier that is indicative of a particular user account may be retrieved from a datastore. For example, the datastore may comprise a table that includes a user account identifier (ID) and the related device identifiers assigned to that user account.

In some implementations, the particular user account associated with an utterance 124 may be determined using a user identification system 306. The user identification system 306 may process the audio data 130 to determine an identity of a user 102. For example, the audio data 130 may be processed to determine characteristics of the utterance 124, such as pitch, tempo, power density, and so forth. These characteristics may be assessed using previously stored data to determine the identity of the user 102 who produced the utterance 124. This identity may comprise the user account identifier that is included in the account data 304. For example, the characteristics for a set of possible users who are associated with a particular participating device, dock 106, or location may be accessed. The characteristics of the utterance 124 may be compared with this set of possible users to determine the identity of the user 102.

The user identification system 306 may use other information to determine the identity of the user 102. For example, if one of the participating devices includes a camera, image data may be acquired using the camera. That image data may then be processed using facial recognition techniques to determine an identity of the user 102. In another example, the participating devices may utilize other sensors to acquire biometric data, such as a fingerprint reader, to provide sensor data 134 that may be used to identity the user 102. Assessment of image data or other sensor data 134 to determine identity may be facilitated based on the device identifier data 126. For example, the facial characteristics of the image data may be compared with the facial characteristics that have been previously stored for the user accounts associated with the device identifier data 126 indicating the participating device that provided the image data and the other participating devices.

The user identification system 306 may also utilize other techniques such as receiving a password or code that is input by the user 102 to determine the identity of the user 102. For example, a prompt may be presented on the display of the first participating device 108 to input a password using an onscreen keyboard.

An output device determination system 308 may be used to determine the output devices 122 that are available for use at a particular time. For example, the output device determination system 308 may be configured to acquire information from one or more of the output devices 122 and maintain information about their availability. The output device determination system 308 accepts as input at least a portion of affiliated device data 138. The affiliated device data 138 comprises information about the affiliated device 104. For example, the affiliated device data 138 may comprise device identifiers that are representative of the first participating device 108 and the second participating device 110.

The output device determination system 308 may also include information indicative of the output capabilities of the respective output devices 122, current state of the output devices 122, and so forth. For example, the output device determination system 308 may acquire information that indicates that a particular output device 122 has a display, speaker, and so forth. The current state may be indicative of output that is currently being presented using the particular output device 122.

The output device determination system 308 may generate the output device data 310. The output device data 310 comprises information that is indicative of one or more of the availability, capability, or state of the output devices 122. The output device data 310 may correspond to a time just prior to the wakeword being uttered, when the wakeword was uttered, after the wakeword was uttered, while the utterance 124 was being spoken, after the utterance 124 was spoken, after the audio data 130 is sent to the speech processing system 114, and so forth.

During operation, the speech processing system 114 may use the orchestrator system 144 to coordinate operation of various systems. In other implementations, one or more functions of the orchestrator system 144 may be performed by other systems.

The command determination system 142 may include or have access to an automated speech recognition (ASR) system 312. The ASR system 312 accepts the audio data 130 as input and produces text data 314 as output. The text data 314 may include or be associated with other information, such as the device identifier data 126, the account data 304, and so forth. In one implementation, the orchestrator system 144 may receive an indication of incoming audio data 130. The orchestrator system 144 may direct the audio data 130 to the ASR system 312, which returns the text data 314. The orchestrator system 144 may then direct the text data 314 to the NLU system 146.

The ASR system 312 may be configured to recognize human speech in detected audio, such as audio captured by a microphone and represented by the audio data 130, and produce text data 314. Techniques for transcribing speech into text are well known in the art and need not be described in further detail herein, and any suitable computer implemented speech to text technique may be used to convert the received audio signal(s) into text, such as Amazon Lex from Amazon Web Services, Inc. of Seattle, Wash., United States of America or SoftSound speech processing technologies available from the Autonomy Corporation, which is headquartered in Cambridge, England, United Kingdom.

The ASR system 312 may include an expression detector that analyzes audio signals received by the speech processing system 114. Such an expression detector may be implemented using keyword spotting technology. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that a particular word or phrase (e.g., a wakeword), is represented within the audio signal. The expression detector may then compare that score to a threshold value to determine whether that word or phrase will be declared as having been spoken.

The different ways a spoken utterance 124 may be interpreted (i.e., the different hypotheses) may each be assigned a probability or a confidence value representing a likelihood that a particular set of words matches those spoken in the utterance 124. The confidence value may be based on a number of factors including, for example, the similarity of the sound in the utterance 124 to models for language sounds (e.g., an acoustic model), and the likelihood that a particular word which matches the sounds would be included in the sentence at the specific location (e.g., using a language or grammar model). Thus, each potential textual interpretation (hypothesis) of the spoken utterance 124 is associated with a confidence value. Based on the considered factors and the assigned confidence value, the ASR system 312 may output as text data 314 the most likely text recognized in the audio data 130. The ASR system 312 may also output multiple hypotheses in the form of a lattice or an N-best list with each hypothesis corresponding to a confidence value or other score (such as probability scores, etc.).

The ASR system 312 may further attempt to match received feature vectors to language phonemes and words as known in previously stored acoustic models and language models. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds or words are used in context with each other, thereby improving the likelihood that the speech recognition process will output speech results that make sense grammatically. The specific models used may be general models or may be models corresponding to a particular domain, such as music, application enablement/disablement, shopping, etc.

The ASR system 312 may generate results in the form of a single textual representation of the speech, an N-best list including multiple hypotheses and respective scores, lattice, and so forth, which may be sent to the NLU system 146 for processing. The NLU system 146 may be configured such that it determines an intent of an utterance 124 based on the text data 314 determined from received audio data 130. The NLU system 146 may determine one or more NLU models that may be capable of handling the intent of the utterance 124. In some examples, each NLU model may be associated with particular domains, which may also be referred to as categories. For example, utterance 124 of "Play Content-Title"" may be identified as being possibly within a music (or audio) domain or a video domain. For instance, the NLU system 146 may identify that the word "Play" as being indicative of a recognized intent for the two domains. In some embodiments, to determine an utterance's 124 intent, the NLU system 146 may communicate with the speechlet system 154 to cause one or more specific speechlets to be accessible, to utilize a speechlet, and so forth.

The natural language understanding (NLU) system 146 uses the text data 314 as input. For example, the orchestrator system 144 may send the text data 314 to the NLU system 146. Other inputs may include one or more of the output device data 310 or speechlet data 150. The NLU system 146 may include a named entity recognition ("NER") system, which may be used to identify portions of the text data 314 that correspond to a named entity recognizable by NLU system 146. A NER process may be configured to link a portion of text data 314 to an actual specific known entity. To perform named entity resolution, the system may utilize stored gazetteer information that matches ASR results with different entities (such as song titles, contact names, etc.). Gazetteers may be linked to a user account or profile of a user account's component, certain domains (e.g., music or shopping), or may be organized in a variety of other ways.

Generally, the NLU system 146 takes text data 314 as input and attempts to make a semantic interpretation of the text data 314. That is, the NLU system 146 may be configured to determine a meaning of text based on the individual words and then implements that meaning. The NLU system 146 may interpret a text string to derive an intent or a desired action of the utterance 124 as well as the pertinent pieces of information in the text that allow an action to be completed. For example, if a spoken utterance 124 is processed by the ASR system 312 and outputs the text, "call mom," the NLU system 146 may determine that an intent of the utterance 124 is to activate a telephone or telephone functionality, and to initiate a call with a contact matching the entity "mom". In some embodiments, the NLU system 146 may process several textual inputs related to the same utterance 124. For example, if the ASR system 312 outputs N text segments (as part of an N-best list), then the NLU system 146 may process all N outputs.

The NLU system 146 may be configured to parse, tag or annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). The NLU system 146 may also be used to provide answer data in response to queries, for example using a previously stored knowledge base.

To correctly perform natural language understanding processing of speech input, the NLU system 146 may be configured to determine a domain of an utterance 124. By determining the domain, the NLU system 146 may narrow down the NLU model and the services and functionalities offered that may be relevant. For example, affiliated devices 104 may offer services relating to interactions with a telephone service, a contact list service, a calendar/scheduling service, a music player service, etc. As another example, the affiliated devices 104 may enable certain services or functionalities for an individual having a user account. Words in a single text query may implicate more than one service, and some services may be functionally linked (e.g., both a telephone service and a calendar service may utilize data from the contact list).

The NER system may be configured to receive a query in the form of one or more results from the ASR system 312. The NER system may then attempt to identify relevant grammars and lexical information that may be used to construe the meaning of the one or more results. To do so, the NER system may begin by identifying one or more potential domains or NLU models that may relate to the received query. The NLU system 146, may include a database that may be used to identify domains associated with specific devices. For example, the first participating device 108 may be associated with domains for music, telephone functionality, calendar information, contact lists, and/or device-specific communications. In addition, the NLU system 146 may store an entity library including database entries for specific services available on a specific device or devices, either indexed by that device's identification number, a customer identification number, a household identification number, or using any other suitable indicator.

A domain may represent a discrete set of activities, services, and/or functionalities that are related, such as by having a common theme, such as "shopping," "music," or "videos." As such, each domain may be associated with a particular language model, grammar database, set of intents/actions, personalized lexicon, and so forth. In some embodiments, each user account may have its own language model including words, phrases, sentence structures, response templates, and the like, configured for the user account. Each gazetteer may include domain-indexed lexical information associated with a particular user account of user accounts system, devices, and so forth. For example, a first gazetteer may include first domain-index lexical information. A music-domain lexical information of a particular user account associated with a user 102 might include album titles, artist names, and song names. In comparison, the user account's contact list lexical information might include the names of contacts. Since a user account's music collection and contact list may differ from others, this personalized information improves entity resolution.

In some embodiments, the NLU system 146 may be configured to apply the rules, models, and information applicable to each identified domain. For example, if a query potentially implicates both communications and music, substantially in parallel, the natural language understanding processing may use the grammar models and lexical information for communications, and may also use the grammar models and lexical information for music. The responses based on the query produced by each set of models is scored, with the overall highest ranked result from all applied domains ordinarily selected to be the correct result.

An intent classification ("IC") system may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a play music intent, "stop," to a stop playing music intent, and "mute" to a mute volume intent. The IC system may be configured to identify potential intents for each domain by comparing words in the query to the words and phrases in that domain's intent database. Traditionally, the determination of an intent by the IC system is performed using a set of rules or templates that are processed against the incoming text to identify a matching intent.

In order to generate a particular interpreted response, the NER system applies the grammar models and lexical information associated with the respective domain to actually recognize one or more entities in the text of the query. Each grammar model includes the names of entities (i.e., nouns) commonly found in speech about the particular domain (i.e., generic terms), whereas the lexical information from the gazetteer is personalized to the user account(s) and/or the device. For instance, a grammar model associated with the shopping domain may include a database of words commonly used when people discuss shopping.

The intents identified by the IC system may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags. As another example, if "Play 'Song 1'" is an identified intent, a grammar framework may correspond to sentence structures such as "Play {Song 1}."

The NER system may parse the query to identify words as subject, object, verb, preposition, etc., based on grammar rules and/or models, prior to resolving named entities. The identified verb may be used by the IC system to identify the intent, which is then used by the NER system to identify frameworks. A framework for an intent of "play" may specify a list of slots/fields/placeholders applicable to play the identified "object" such as, for example, {Artist Name}, {Album Name}, {Song Name}, {Application Name}, {Anaphoric Term}, and any object modifier (e.g., a prepositional phrase). The NER system may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or a NER model may be constructed using techniques such as hidden Markov models, maximum entropy models, log linear models, conditional random fields ("CRF"), and the like.

For instance, a query of "Play 'Song 1' by 'Artist 1'" might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, in which the IC component may determine corresponds to the "play music" intent. No determination has been made as to the meaning of "Song 1" and "Artist 1," but based on grammar rules and models, it may be determined that the text of these phrases relate to the grammatical object (i.e., entity) of the query.

The frameworks linked to the intent may then be used to determine what database fields should be searched to determine the meaning of these phrases, such as searching a user account's gazetteer for similarity with the framework slots. For example, a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, the NER system may search the database of generic words associated with the particular domain. For instance, if the query was "play songs by 'Artist 1,'" after failing to determine an album name or song name called "songs" by "Artist 1," the NER system may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding process may be tagged to attribute meaning to the query. So, for instance, "Play 'Song 1' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," Intent "Play Music," {Artist Name}: "Artist 1," and {Media Type}: Song. Still further, "Add this to my cart" might produce a result of: {Domain}: Shopping, {Intent}: "Add item to," {Anaphoric Term}: "this," and {List Type}: "cart."

In some examples, the NLU system 146 may also include an entity resolution component, which allows the NLU system 146 to query each domain of the NLU system 146 to determine which domain or domains are best able to handle a given request. Upon performing the query, each domain may return a score indicating a likelihood that they can handle the application in question. For instance, various domains may return scores of LOW, MEDIUM, or HIGH, indicating the likelihood that they can handle the particular application. The entity recognition component may return application names or titles for the request, which may be based on relevance scores that estimate a confidence that a particular application may be best used for the request. As an illustrative example, if the utterance 124 is, "Play my music," the NLU system 146 may determine, using the entity resolution component, which domains and associated applications can likely handle this request. Thus, the domain or application therein having the highest confidence value may be selected as being the domain or application able to handle the request.

In some embodiments, the NLU system 146 may include a contextual resolution system, configured to identify entities for assisting NLU processing using contextual metadata such as output device data 310. For example, in response to receiving audio data 130 representing an utterance 124 from the audio activated device that is the second participating device 110 to the affiliated devices 104, the speech processing system 114 may query to receive the output device data 310 for the television 122(4) that indicates the television is currently presenting video. This information provides context and may be used to select an NLU model, determine the confidence value of a particular intent, and so forth. For example, if the video is currently being presented, intents generated by the NLU model associated with video may exhibit a greater confidence value than intents generated by the audio NLU model.

In some embodiments, the various domains may include formatting logic that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being presented by one or more of the output devices 122 during a time when the utterance 124 is spoken.

In some embodiments, the contextual resolution system may determine whether any slots/fields from intent resolution processing by the NLU system 146 substantially match any slots/fields from the contextual metadata received. For instance, the entity data that is received from the domain may include similar entities (e.g. slots) as the entities associated with the intent identified by the NLU system 146. This may include having contextual slots from the contextual metadata being associated with similar attributes as those slots from intent resolution by the NLU system 146. As an example, the "play music" intent may include slots for application data—{Application Data Slot}, song name—{Song Name}, album name—{Album Name}, artist name—{Artist Name}, genre name—{Genre Name}, playlist name—{Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From the NLU system 146, the text data 314 may be used to identify some or all of the values for these slots. For example, if the utterance 124 is, "Play 'Song 1'," then {Song Name} may have a value "Song 1." However, the remaining slots may remain unfilled. The contextual metadata may indicate output device data 310, such as whether the output device 122(4) is presenting video.

The contextual resolution system may be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is a contextual entity slot {Song Name} having a value "Song 1," then the specific song to be played may be determined to be the audio file associated with "Song 1."

The contextual resolution system may be configured to determine a heuristics score that indicates a number of matching entities (e.g., matching slots) between the entity data/contextual metadata and the declared slots for the identified intent. For example, using the previous example, the contextual metadata may include such slots as {Song Name}, {Album Name}, and/or {Artist Name}, amongst other slots. Therefore, in this particular scenario, the heuristics score may be three, indicating that there are three slots corresponding to similar entities for both the declared slots from the IC component and the contextual resolution system. If the heuristics score is greater than zero, then the NLU system 146 may be configured to generate a selected context file that may be included with the output data from the NLU system 146. For example, the selected context file may be included in the intent data 152.

The NLU system 146 may include a plurality of NLU models 316(1), 316(2), . . . , 316(M). Each NLU model 316 may be associated with a different operational domain, such as video, audio, books, shopping, home automation, and so forth. As described above, a particular NLU model may be trained or otherwise configured to provide for operation within a particular set of intents and possible values. In some examples, different NLU models 316 may be trained using different sets of data. Different NLU models 316 may be associated with individual devices or particular types of devices.

The NLU system 146 may include a model selector component to select a particular NLU model 316 for use in processing the text data 314. For example, the device identifier data 126 indicative of a particular device may be used to select the particular NLU model 316 that is used. In another example, the model selector component may use the output device data 310 to determine that video content is being presented by the affiliated devices 104 that also produced audio data 130 which was subsequently used to generate the text data 314. Based on the information that video content is being presented, the model selector component may select the NLU model 316 that is associated with the video domain. For example, this NLU model 316 may have been trained to recognize movie titles, commands associated with movie playback, and so forth.

The NLU system 146 may use the selected NLU model 316 to generate the intent data 152. The intent data 152 may include a first set of possible intents 318 as produced by the selected NLU model 316. In some implementations, the first set of possible intents 318 may include intents generated by a plurality of NLU models 316. For example, the NLU models 316 associated with the participating devices of the affiliated devices 104 may be used to generate the first set of possible intents 318.

The intent data 152 may include one or more of intent 320, slot 322, and confidence value 324. The intent 320 comprises information indicative of the meaning of the text data 314 such as a direction to perform an action. For example, direction to perform an action may specify presenting content 120. The slot 322 comprises information associated with the intent 320, such as a title of the content 120 for which the action is to be performed. The confidence value 324 comprises information indicative of a likelihood that the particular intent 320 and slot 322 are deemed to be correct. For example, the confidence value 324 may comprise a value of between 0 and 1.0, with 1.0 meaning that the intent 320 and the slot 322 correctly represent the intent of the user 102 as conveyed in the utterance 124.

A particular set of text data 314 may have several possible combinations of intent 320 and slot 322 with their respective confidence values 324. Continuing the example above, the text data 314 of "Play ContentTitle" may be relevant to several different pieces of content 120 that share the same name.

A filter component 326 may be used to generate a second set of possible intents 328. The filter component 326 may accept as input the first set of possible intents 318 as well as speechlet data 150 produced by the speechlet determination system 148.

As described above, the user account of a particular user 102 may be associated with one or more speechlets. Different users 102 may have different speechlets. The first set of possible intents 318 may include intents 320 or slots 322 that do not correspond with an available speechlet. For example, the first set of possible intents 318 may include several combinations of the intent 320 to play music including a combination having a slot 322 for a song title that is not available through the audio streaming service that the particular user account is associated with.

The filter component 326 may be used to filter or otherwise generate the second set of possible intents 328. For example, the filter component 326 may generate a second set of possible intents 328 by associating the first set of possible intents 318 with the speechlet data 150. Those combinations of intent 320 and slot 322 that do not correspond to the speechlet data 150 are omitted from the second set of possible intents 328. For example, if no speechlet provides for gaming, the intent 320 in the first set of possible intents 318 that represents playing a video game may be omitted. The association between speechlet data 150 and the first set of possible intents 318 is discussed in more detail below with regard to FIG. 4.

An intent selector component 330 may be used to determine the highest-ranking intent from the second set of possible intents 328. The entry in the second set of possible intents 328 that has the greatest confidence value 324 may be selected and subsequently sent to the speechlet system 154 which then generates the command data 156. For example, the pair of intent 320 and slot 322 having the numerically greatest confidence value 324 may be selected and sent to the speechlet system 154 that is associated with the intent 320. The speechlet system 154 may process the intent 320 and generate the command data 156. The command data 156 may then be sent to the output device 122 for presentation. Continuing the example, the selected intent of "play ContentTitle" may be processed by the speechlet system 154 to produce command data 156 that includes a URL for presenting that song using the Speechlet1.

Figure 4:
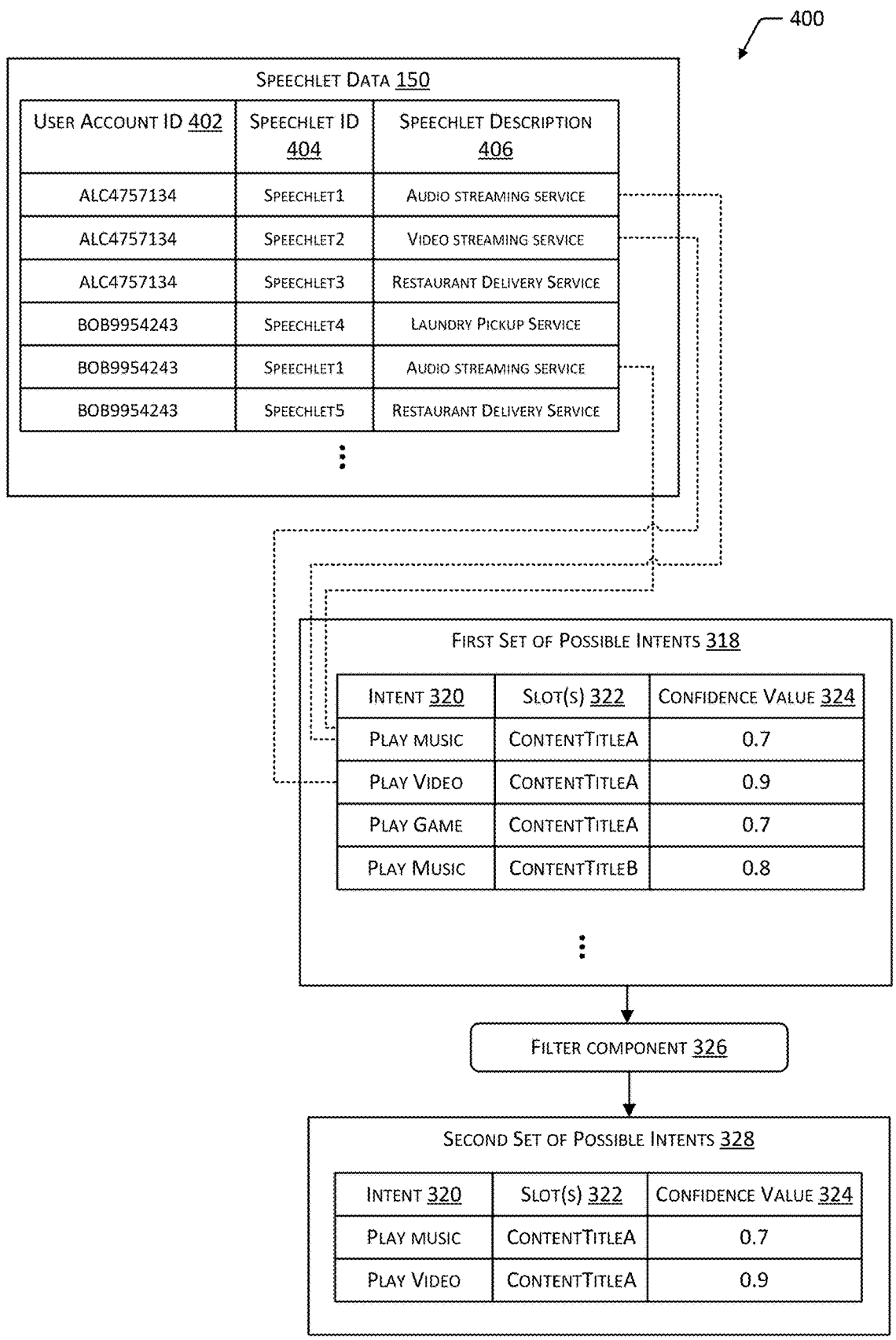
FIG. 4 illustrates the use of speechlet data to filter possible intents, according to one implementation.

FIG. 4 illustrates a block diagram 400 of using speechlet data 150 to filter a first set of possible intents 318 and generate the second set of possible intents 328, according to one implementation. The data structures in this figure are depicted as tables for ease of illustration, and not necessarily as a limitation.

The speechlet data 150 may comprise one or more of a user account identifier (ID) 402, a speechlet identifier 404, a speechlet description 406, and so forth. The user account identifier 402 identifies a particular user account within the system 100. In this illustration, speechlet data 150 is depicted for a mixed-use scenario in which the speechlets for the user accounts associated with the participating devices of the affiliated devices 104 have been merged.

In one implementation, a speechlet may be associated with a particular device. For example, the affiliated devices 104 may be associated with the speechlet that allows for control of home automation in the home where the affiliated devices 104 are placed. With this implementation, the speechlet may be accessible regardless of the user account.

For example, the user 102(1) may be associated with the user account ID 402 value of "ALC4757134" while the user 102(2) is associated with the user account ID 402 value of "BOB9954243". In some implementations, users 102 may share a user account ID 402. For example, children may use the user account (ID) 402 of their parent. The speechlet ID 404 identifies a particular speechlet while the speechlet description 406 provides information about the functionality provided by the speechlet. For example, the speechlet ID 404 "Speechlet1" identifies a speechlet that provides an audio streaming service.

As described above, the NLU system 146 may produce a first set of possible intents 318. These may be generated using NLU models 316 that are trained for various domains. As a result, they may include possible intents that invoke speechlets unavailable to a particular user account. For example, as illustrated here, the first set of possible intents 318 includes four combinations of intents 320 and slots 322.

The filter component 326 may determine the correspondence between particular speechlets and particular combinations of intents 320 and slots 322. For example, as shown here, the intents 320 to "play music" and slots 322 involving the title "ContentTitleA" correspond with speechlets involving an audio streaming service and a video streaming service that are able to deliver content 120 with that title. However, since neither service has content 120 titled "ContentTitleB" available to the associated user account, that combination of intent 320 and slot 322 is not associated with a speechlet. Likewise, no gaming speechlet is available in the speechlet data 150 to correspond with the intent 320 "play game", so no association with a speechlet is present.

The filter component 326 may generate a second set of possible intents 328 that is limited to the combinations of intent 320 and slot 322 that are associated with speechlets that are available, as indicated in the speechlet data 150. For example, the second set of possible intents 328 in this example comprises two combinations of intent 320 and slot 322, one to play music titled "ContentTitleA" and one to play video titled "ContentTitleA".

Various techniques may be used to determine the correspondence between speechlet data 150 and possible intents. In one implementation, particular words may be associated with a particular speechlet. For example, the word "Speechlet1" may be associated with that speechlet. An intent 320 that includes that word, such as "play using Speechlet1" may be deemed to correspond with the Speechlet1 speechlet. In another example, particular speechlets and intents may be associated with categories. For example, the speechlet data 150 may include speechlet category data, such as "content provider". The intents 320 may also include category data associated with the action implicated. Continuing the example, some of the intents 320 may be deemed to have actions that implicate "content provider". The match between the category data of the intent 320 and the speechlet data 150 may be used to determine the correspondence between speechlet and intent.

Figure 5:
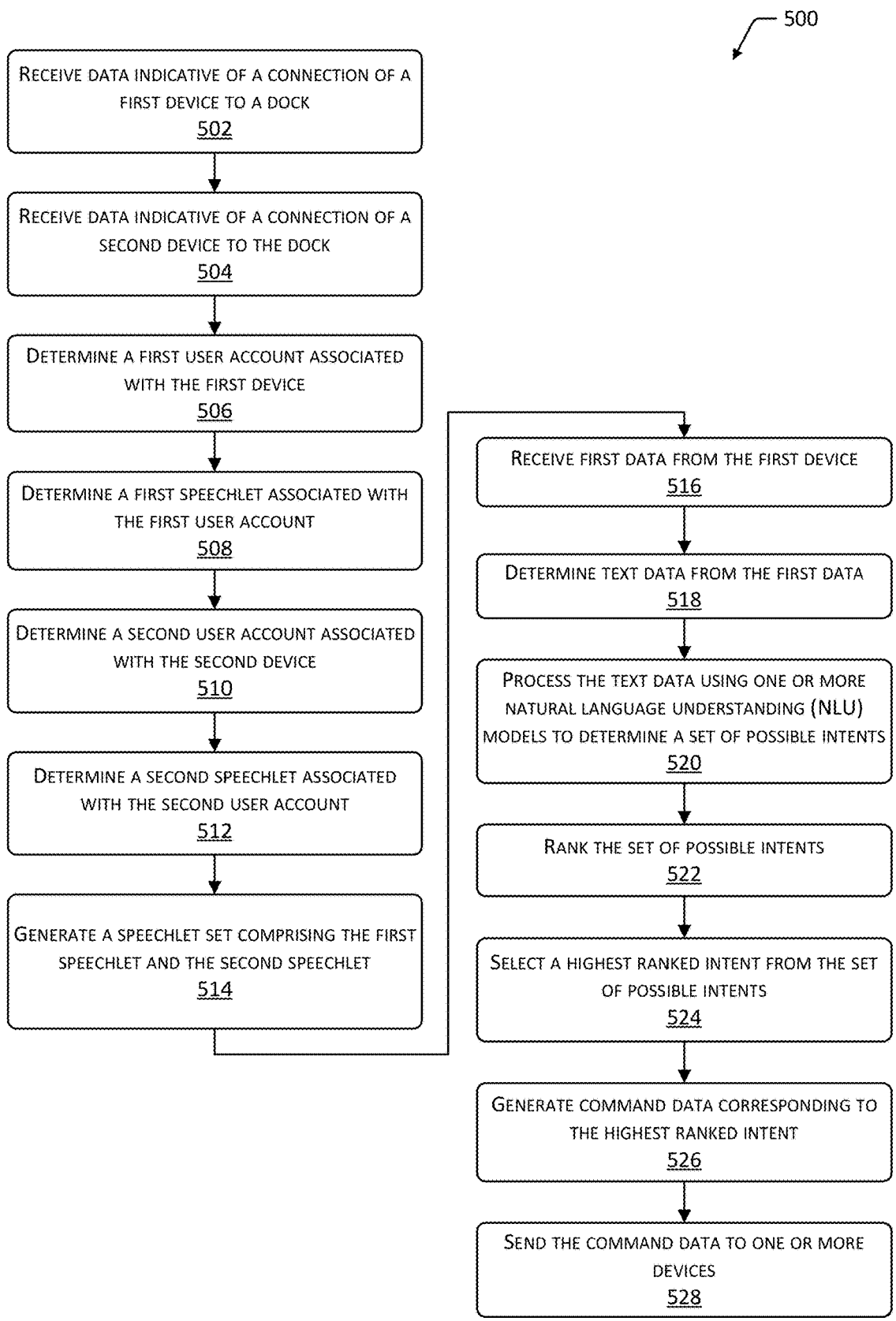
FIG. 5 illustrates a flow diagram of a process to generate command data from the utterance of the user, according to one implementation.

FIG. 5 illustrates a flow diagram 500 of a process to generate command data 156 from the utterance 124 of the user 102, according to one implementation. The process may be executed at least in part by the speech processing system 114.

At 502, data is received that is indicative of a connection of a first device to a dock 106. For example, the dock management system 136 may receive the device identifier data 126 from the first participating device 108.

At 504, data is received that is indicative of a connection of a second device to the dock 106. For example, the dock management system 136 may receive device identifier data 126 from the second participating device 110.

At 506, a first user account associated with the first device is determined. As described above, the device identifier data 126 may include a device identifier. A datastore may be queried with the device identifier to return a first user account ID indicative of a particular user account. For example, the device identifier of the first participating device 108 may be used to query the datastore.

At 508, a first speechlet associated with the first user account is determined. A datastore may be queried with the first user account ID to return one or more speechlet IDs indicative of particular speechlets that are accessible to that user account.

At 510, a second user account associated with the second device is determined. For example, the device identifier of the second participating device 110 may be used to query the datastore and return a second user account ID.

At 512, a second speechlet associated with the second user account is determined. For example, the second user account ID may be used to query a datastore and return the one or more speechlet IDs indicative of particular speechlets that are accessible to that user account.

As described above, various techniques may be used to determine which speechlets will be used in the determination of the command data 156. At 514, a speechlet set is generated that comprises the first speechlet and the second speechlet. For example, the speechlet set may comprise the data processing functions provided by the first speechlet and the data processing functions provided by the second speechlet. In one implementation, the speechlet set may comprise a list that is indicative of the speechlets included, therein. Continuing the example above, the speechlet set may comprise a list that indicates the first speechlet and the second speechlet.

The process may utilize one or more NLU models 316 to process the text data 314. The NLU model(s) 316 is used to determine a set of possible intents that are representative of intended actions as expressed in first data.

At 516, the first data, such as audio data 130 is received from the first device. For example, the second participating device 110 may detect the utterance 124 of the user 102 with one or more microphones and generate the audio data 130.

The audio data 130 may be sent via the network 112 to the speech processing system 114. In other implementations the first data may comprise other data, such as data obtained from a touch interface, from a gestural interface, and so forth. For example, the first data may comprise video of the user 102 obtained by a camera.

At 518, text data 314 is determined from the first data. For example, as described above the ASR system 312 may process the audio data 130 and generate the text data 314.

At 520, the text data 314 is processed using one or more NLU models 316 to determine a first set of possible intents 318. The first set of possible intents 318 may be limited to those intents that have corresponding speechlets in the first set of speechlet data 150. For example, the first set of possible intents 318 may omit intents produced by the first NLU model 316 that do not have corresponding speechlets in the speechlet data 150.

In some implementations the NLU model(s) 316 used to process the text data 314 may be determined based on the participating device. For example, a first NLU model 316 may be determined that is associated with the first device. Continuing the example, the first participating device 108 may comprise a tablet that is configured to present video, and thus this type of device may be associated with an NLU model 316 trained for an operational domain involving video content. A second NLU model 316 associated with the second device may be determined. For example, the second participating device 110 may comprise an audio activated device that is configured to present audio, and thus this type of device may be associated with an NLU model 316 trained for an operational domain involving audio content. The first NLU model 316 and the second NLU model 316 may be used to determine the set of possible intents. As described above, the set of intents may be limited to those intents that are supported by the speechlet set.

At 522, the set of possible intents is ranked. For example, the ranking may comprise sorting the intents within the set in descending order of the confidence value 324.

At 524, a most likely intent is selected from the set of possible intents. For example, the combination of intent 320 and slot 322 that exhibits a greatest confidence value 324 may be selected. For example, the intent "Play video" titled "ContentTitle" using speechlet "Speechlet2" may have the greatest confidence value 324, and thus may be designated as the highest ranked intent.

In some implementations, the ranking of the set of possible intents may be affected by other factors. For example, the output device data 310 may provide information that another output device 122 is associated with the affiliated devices 104. Based on this information, intents involving actions of the output device 122 may have their ranking increased. The output device data 310 may include information about the output capability of the output device 122. If the output device 122 is capable of presenting video, for example, then intents involving video may be increased relative to intents involving audio. In other implementations, the association may be with the individual participating devices or the dock 106 instead of or in addition to the affiliated devices 104. For example, the ranking may be based on the output device data 310 for an output device 122 that is associated with the first participating device 108. In another example, the ranking may be based on the output device data 310 for an output device 122 that is associated with the dock 106.

At 526, command data 156 corresponding to the highest ranked intent is generated. Continuing the example, the speechlet system 154 that is associated with the highest ranked intent may be used to generate the command data 156 comprising instructions to "Play video" with the title "ContentTitle" to the service that supports the "Speechlet2" speech let.

At 528, the command data 156 is sent to one or more devices. For example, the command data 156 may be sent to the content system 116 that supports the "Speechlet2" speech let, or may be sent to an output device 122, such as one or more the affiliated devices 104. The receiving system may then use the command data 156 to perform an action, such as presenting the content using the output device 122.

The output device 122 may be determined using the output device data 310 provided by the output device determination system 308 as filtered based on the intent data 152. For example, the output device data 310 may indicate a set of output devices 122 that may be available at the time of the utterance 124. The output device 122 may then be selected based on the particular intent data 152. For example, an intent to "play ContentTitle on living room TV" specifies the particular output device 122(4), which would then be used for presentation.

Figure 6:
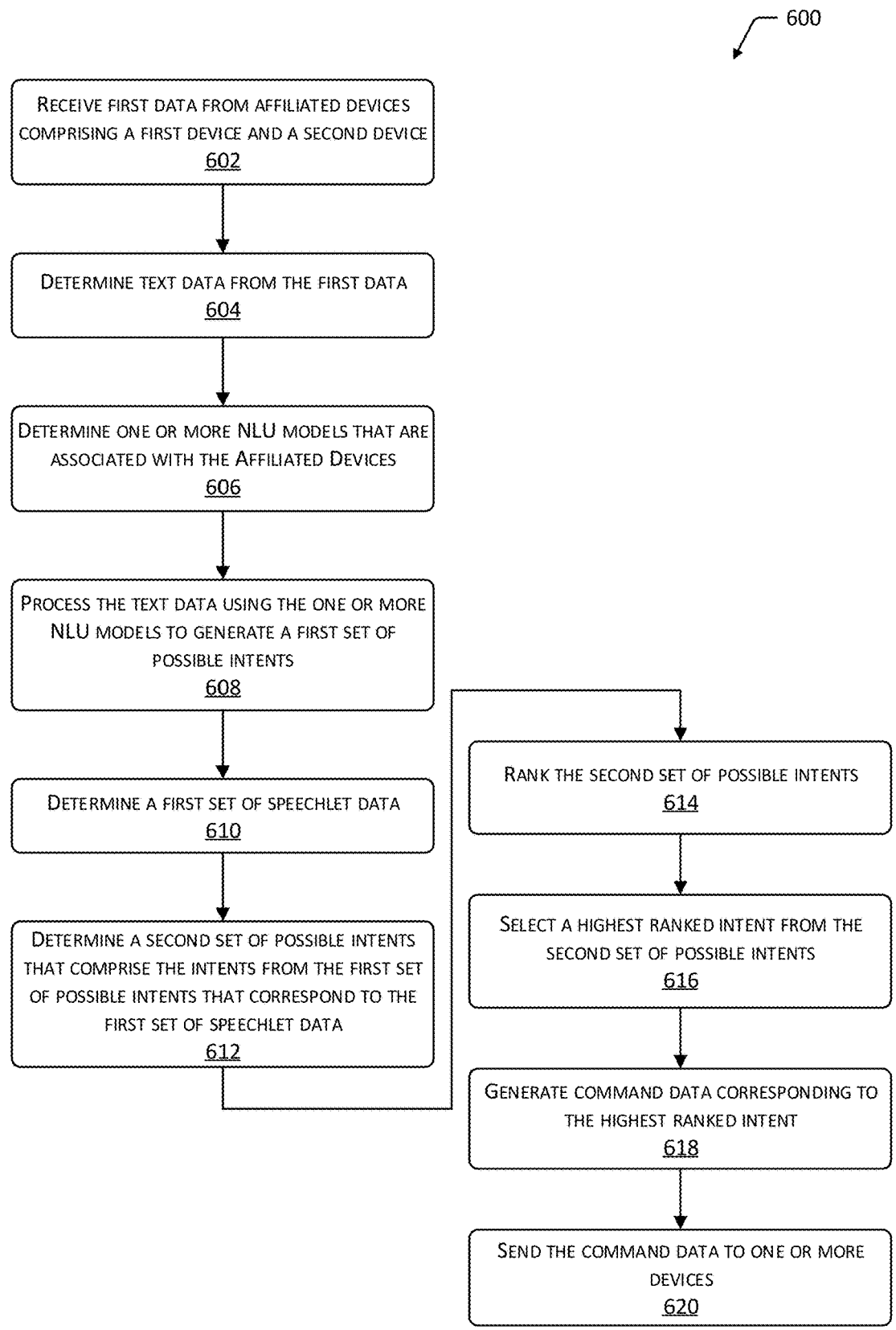
FIG. 6 illustrates a flow diagram of another process to generate command data from the utterance of the user, according to one implementation.

FIG. 6 illustrates a flow diagram 600 of another process to generate command data 156 from the utterance 124 of the user 102, according to one implementation. The process may be executed at least in part by the speech processing system 114.

At 602, first data is received from affiliated devices 104. As described above, the affiliated devices 104 may comprise a first device such as the first participating device 108 and a second device such as a second participating device 110. For example, the first data may comprise audio data 130 received from the first participating device 108.

At 604, text data 314 is determined from the first data. For example, as described above the ASR system 312 may process the audio data 130 and generate the text data 314.

At 606, one or more NLU models 316 are determined that are associated with the affiliated devices 104. For example, one or more NLU models 316 may be associated with the first participating device 108, the second participating device 110, the dock 106, or the affiliated devices 104.

At 608, the text data 314 is processed using the one or more NLU models 316 to determine a first set of possible intents 318.

At 610, a first set of speechlet data 150 is determined. The speechlet determination system 148 may determine speechlet data 150 as described above. In one implementation, the speechlets may comprise a merger of the speechlets for the user accounts associated with the participating devices. In another implementation, the speechlets may comprise the speechlets for one of the user accounts associated with the participating devices. For example, the user 102 who produces the utterance 124 may be identified, and the speechlets associated with their user account may be used as the first set of speechlet data 150.

At 612, a second set of possible intents 328 are determined. The second set of possible intents 328 may comprise the intents from the first set of possible intents 318 that correspond to speechlets in the first set of speechlet data 150. For example, the filter component 326 may produce the second set of possible intents 328 by selecting from the first set of possible intents 318 those intents that are associated with speechlets indicated by the speechlet data 150.

At 614, the second set of possible intents 328 is ranked. For example, the second set of possible intents 328 may be sorted by the respective confidence values 324 for the combinations of intent 320 and slot(s) 322.

At 616, a highest ranked intent is selected from the second set of possible intents 328. For example, the combination of intent 320 and slot 322 that has the greatest confidence value 324 may be selected.

At 618, command data 156 corresponding to the highest ranked intent is generated. For example, the highest ranked intent may be provided to the corresponding speechlet system 154. The speechlet system 154 processes the intent and generates the command data 156.

At 620, the command data 156 is sent to one or more devices. For example, the speechlet system 154 may send the command data 156 to a server that operates on the command data 156 to begin presentation of content.

Figure 7:
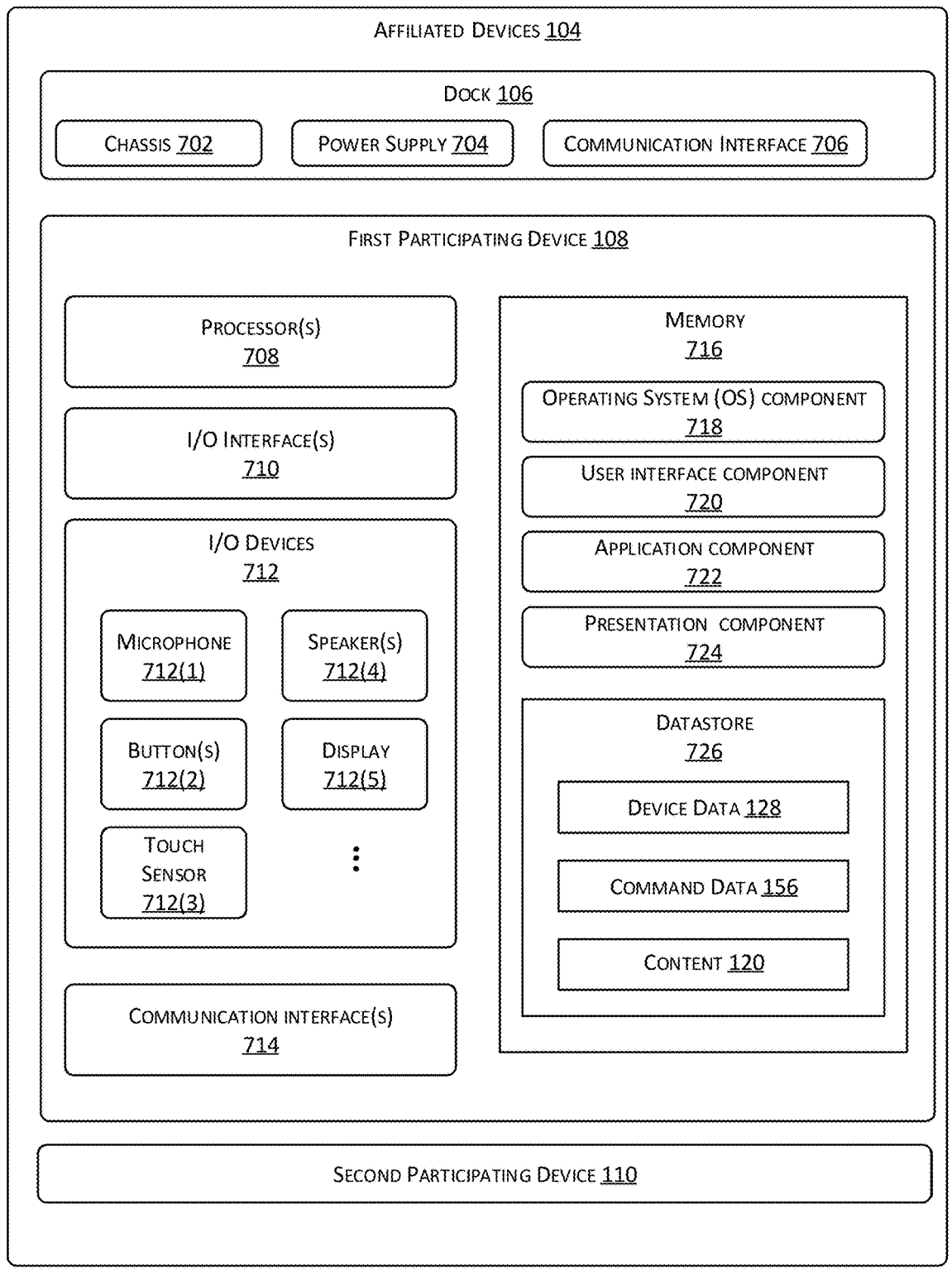
FIG. 7 illustrates a block diagram of the affiliated devices, according to one implementation.

FIG. 7 illustrates a block diagram 700 of the affiliated devices 104, according to one example. The affiliated devices 104 is illustrative and non-limiting. The affiliated devices 104 includes a dock 106. The dock 106 may comprise a chassis 702. The chassis 702 provides physical structure which supports the participating devices. In some implementations, the chassis 702 may include one or more mechanical engagement features that are configured to mechanically engage one or more of the participating devices. For example, the mechanical engagement features may include latches, tabs, ridges, grooves, magnets, and so forth.

The dock 106 may include a power supply 704. The power supply 704 may be configured to provide electrical power to one or more of the participating devices. For example, the power supply 704 may transform alternating current at a first voltage obtained from a household outlet to direct current at a second voltage. One or more connectors, wireless power transfer devices, or other devices may be used to transfer electrical power to the participating devices when they are supported by the dock 106.

The dock 106 may include a communication interface 706. The communication interface 706 may include one or more active components. For example, the dock 106 may include a universal serial bus (USB) hub and controller that allows for connection to the participating devices. In another example, the dock 106 may utilize a wireless interface, such as a Bluetooth or WiFi interface to allow communication between and with participating devices.

In some implementations, the dock 106 may include passive wiring, such as electrical conductors that extend from a first connector configured to connect to the first participating device 108 and a second connector configured to connect to the second participating device 110. For example, the connectors may comprise connectors that are compliant with the USB standard to support a USB connection between the participating devices.

The connectors that join the dock 106 to the participating devices may support communication and also allow for delivery of electrical power. For example, the USB connection may provide power from the power supply 704 to the connected participating devices.

The communication interface 706 may be configured to provide dock identifier data to connected devices. For example, the USB interface of the dock 106 may be used to send the dock identifier data to the first participating device 108, the second participating device 110, or both.

The affiliated devices 104 may include other components. For example, the affiliated devices 104 may include a processor, memory, and so forth.

The affiliated devices 104 may be configured to support two or more participating devices. In this illustration, the affiliated devices 104 include the first participating device 108 and the second participating device 110. In other implementations, the dock 106 may support three or more participating devices.

The first participating device 108 may include one or more processors 708 configured to execute one or more stored instructions. The processor(s) 708 may comprise one or more cores, and may also be referred to as hardware processors.

The first participating device 108 may include one or more I/O interface(s) 710 to allow the processor(s) 708 or other portions of the first participating device 108 to communicate with other devices. The I/O interface(s) 710 may comprise I2C, SPI, USB, RS-232, and so forth.

The I/O interface(s) 710 may couple to one or more I/O devices 712. The I/O devices 712 may include one or more input devices such as a keyboard, a mouse, a microphone 712(1), user input buttons 712(2), a touch sensor 712(3), a digital camera, and so forth. The I/O devices 712 may also include output devices such as one or more speakers 712(4), one or more displays 712(5), and so forth. In some embodiments, the I/O devices 712 may be physically incorporated within the first participating device 108, or they may be externally placed. The I/O devices 712 may include various other devices, as well.

The first participating device 108 may also include one or more communication interfaces 714. The communication interface(s) 714 are configured to provide communications with other devices, network 112 accessible resources, the speech processing systems 114, the content systems 116, routers, wireless access points, and so forth. The communication interfaces 714 may include wireless functions, devices configured to couple to one or more networks 112 including local area networks (LANs), wide area networks (WANs), and so forth. The first participating device 108 may also include one or more busses or other internal communications hardware or software that allow for the transfer of data between the various components and components of the first participating device 108.

The first participating device 108 includes one or more memories 716. The memory 716 comprises one or more computer-readable storage media (CRSM). The memory 716 provides storage of computer readable instructions, which enables the first participating device 108 to perform one or more of the functions described herein. The memory 716 may include an operating system (OS) component 718. The OS component 718 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth. The OS component 718 is configured to manage hardware devices such as the I/O interface(s) 710, the I/O devices 712, the communication interface(s) 714, and provide various services to applications or components executing on the processors 708.

Also, stored in the memory 716 may be one or more of the following components. These components may be executed as foreground applications, background tasks, and so forth. A user interface component 720 may be configured to provide a user interface, acquire information from user input, and so forth. The user interface component 720 may be configured to operate with information encoded as hypertext markup language ("HTML") files, extensible markup language ("XML") files, or in another suitable format or language. In some examples, the user interface component 720 may be configured to detect a wakeword and perform an action, such as acquiring audio data 130. The user interface component 720 may be configured to accept inputs and send outputs using the I/O interfaces 710, the communication interfaces 714, or both.

The memory 716 of the participating device may also store one or more application components 722. The application components 722 may provide TTS capability, ASR capability, acquire and send the output device data 310, a web browser, an email client, and so forth.

The memory 716 may also include one or more presentation components 724. The presentation components 724 may be configured to present audio content, video content, textual content, haptic content, and so forth.

The memory 716 may also include a datastore 726 to store information. The datastore 726 may use a flat file, database, linked list, tree, executable code, or other data structure to store the information. In some examples, the datastore 726 or a portion of the datastore 726 may be distributed across one or more devices including the server, network attached storage apparatus, other participating devices, and so forth.

The datastore 726 may store the audio data 130, the output device data 310, the device data 128, the command data 156, the content 120, or any portion or combination thereof. The first participating device 108 may provide audio data 130 to the speech processing system 114, receive command data 156 and so forth. The first participating device 108 may be configured to change operation based at least in part on the command data 156 received.

The affiliated devices 104 also supports the second participating device 110. The second participating device 110 may have one or more of the components described above with regard to the first participating device 108. The participating devices may have the same or different components, capabilities, operating systems, and so forth.

Figure 8:
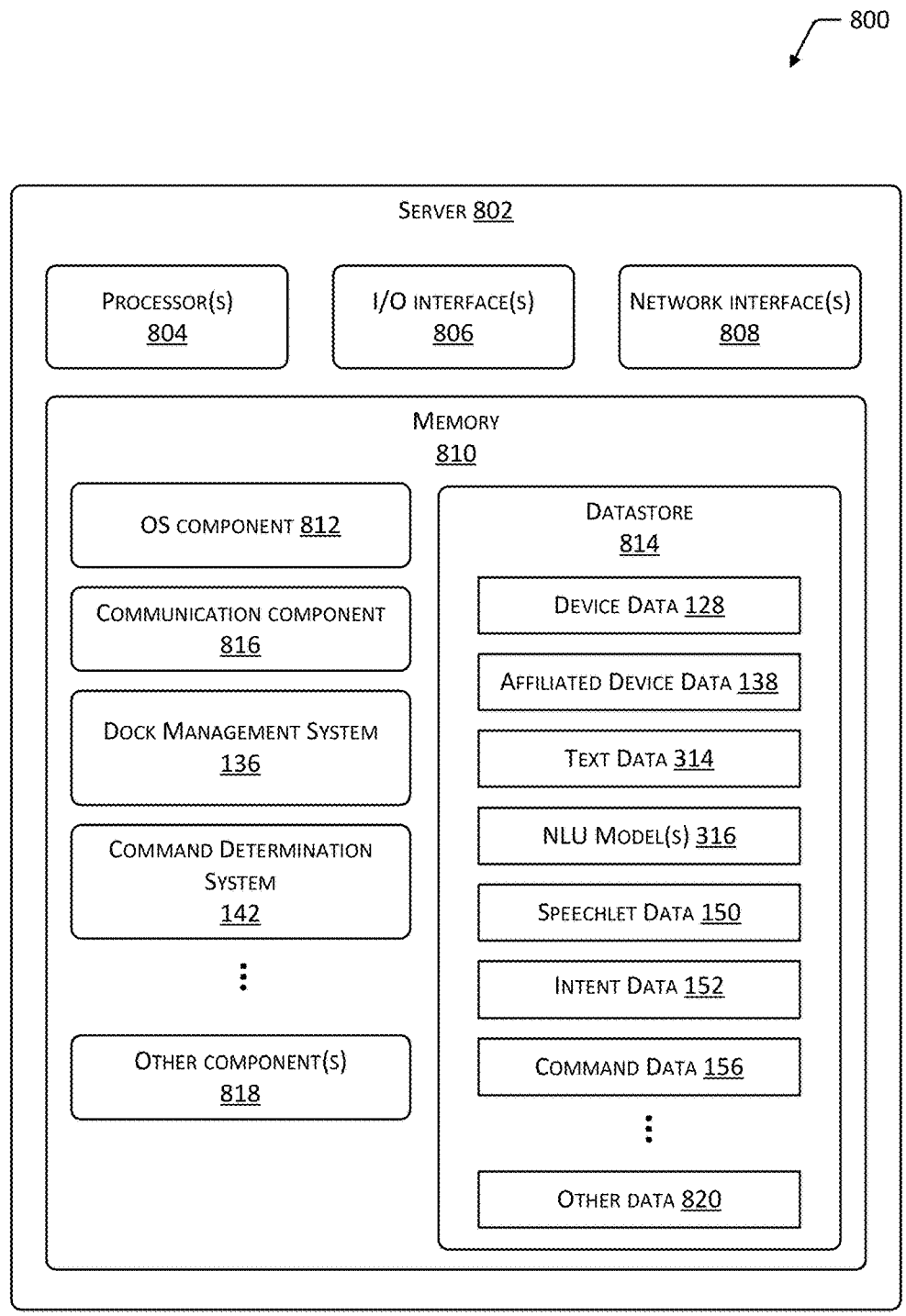
FIG. 8 illustrates a block diagram of a server configured to execute the command determination system, according to one implementation.

FIG. 8 illustrates a block diagram 800 of a server 802 configured to execute at least a portion of the speech processing system 114, according to one example. One or more servers 802 may be used to provide the functionality described herein. The servers 802 comprise one or more computing devices upon which the various systems may be executed. A system may be executed using the resources of several servers 802. For example, execution of the software that provides the system may be distributed across multiple servers 802.

The server 802 may include one or more processor(s) 804 configured to execute one or more stored instructions. The processor(s) 804 may comprise one or more cores, and may also be referred to as hardware processors.

The server 802 may include one or more I/O interface(s) 806 to allow the processor(s) 804 or other portions of the server 802 to communicate with other components. The I/O interface(s) 806 may comprise I2C, SPI, USB, RS-232, and so forth.

The server 802 may also include one or more network interface(s) 808. The network interfaces 808 are configured to provide communications with devices, other servers 802, and so forth via one or more networks, such as the network 112. The network interfaces 808 may be configurable to couple to one or more networks 112 including LANs, WANs, and so forth. The server 802 may also include one or more busses or other internal communications hardware or software that allow for the transfer of data between the various components and components of the server 802.

The server 802 includes one or more memories 810. The memory 810 comprises one or more CRSM. The memory 810 provides storage of computer readable instructions, which enable the server 802 to perform the functions described herein.

The memory 810 may include at least one operating system (OS) component 812. Respective OS components 812 are configured to manage hardware devices such as the I/O interface(s) 806, the network interface(s) 808, and provide various services to applications or components executing on the processor(s) 804. The one or more OS components 812 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

The memory 810 may also include a datastore 814. The datastore 814 may use a flat file, database, linked list, tree, executable code, or other data structure to store the information. In some examples, the datastore 814 or a portion of the datastore 814 may be distributed across one or more other servers 802, network attached storage apparatus, and so forth.

The datastore 814 may store the device data 128, the affiliated device data 138, text data 314, the speechlet data 150, the NLU models 316, the intent data 152, or a combination thereof. Command data 156 generated by the command determination system 142 may also be stored.

One or more of the following components may be stored in the memory 810. These systems or components may be executed as foreground applications, background tasks, and so forth. The command determination system 142, or a portion thereof, may be stored in the memory 810.

A communication component 816 may be configured to establish communications with one or more of the affiliated devices 104, participating devices, other servers 802, and so forth. The communications may be authenticated, encrypted, and so forth.

The dock management system 136 may determine the affiliated device data 138, manage the participating devices, and so forth as described above. For example, the dock management system 136 may receive the device identifier data 126 and determine an identifier associated with the dock 106 has been provided by participating devices. Those participating devices that report a matching dock device identifier may be designated as affiliated devices 104.

As described above in FIGS. 1-4, the command determination system 142 may be used to generate the command data 156.

The memory 810 may also include one or more other component(s) 818. The other component(s) 818 may include account management components, billing components, and so forth. Other data 820 may also be stored in the datastore 814.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative examples will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    at least one memory storing computer-executable instructions; and
    at least one processor in communication with the at least one memory, the at least one processor executing the computer-executable instructions to:
        determine a first device is associated with a user account;
        determine a first speechlet associated with the user account, wherein the first speechlet comprises a first set of data processing functions available to the first device;
        determine a second device is associated with the user account;
        determine a second speechlet associated with the user account, wherein the second speechlet comprises a second set of data processing functions available to the second device;

generate a speechlet set comprising the first set of data processing functions and the second set of data processing functions;
determine a third device that is associated with the first device;
determine an output capability that is indicative of a type of output that the third device is able to present;
receive first data from the first device;
process the first data using a first natural language understanding (NLU) model to determine a set of possible intents that are representative of intended actions as expressed in the first data that are available in the speechlet set;
based at least in part on the output capability, determine a first intent of the set of possible intents as a first ranked intent associated with performing an action;
generate command data corresponding to the first ranked intent; and
send the command data to another device.

2. The system of claim 1, further comprising:
at least one memory storing second computer-executable instructions; and
at least one processor in communication with the at least one memory, the at least one processor executing the second computer-executable instructions to:
determine a dock device that is associated with the user account; and
wherein a rank of an intent in the set of possible intents is based at least in part on an output capability of the dock device.

3. A system comprising:
at least one memory storing computer-executable instructions; and
at least one processor in communication with the at least one memory, the at least one processor executing the computer-executable instructions to:
determine a first device is associated with a user account;
determine a second device is associated with the user account;
determine speechlet data indicative of one or more speechlets available to the first device and the second device to process one or more intents;
determine a third device that is associated with the first device;
determine an output capability that is indicative of a type of output that the third device is able to present;
receive first data from one or more of the first device or the second device;
process the first data using a first natural language understanding (NLU) model to determine a set of possible intents that are representative of intended actions as expressed in the first data that are available to the one or more speechlets indicated by the speechlet data;
rank the set of possible intents;
based at least in part on the output capability, select, from the set of possible intents, a first ranked intent associated with performing an intended action; and
generate command data corresponding to the first ranked intent.

4. The system of claim 3, the at least one processor further executing the computer-executable instructions to:
determine the one or more speechlets comprise a first speechlet associated with the first device, wherein the first speechlet comprises a first set of data processing functions; and
determine the one or more speechlets comprise a second speechlet associated with the second device, wherein the second speechlet comprises a second set of data processing functions;
wherein the speechlet data comprises a third set of data processing functions from the first speechlet and from the second speechlet.

5. The system of claim 3, the at least one processor further executing the computer-executable instructions to:
determine a second natural language understanding (NLU) model associated with the first device;
determine a third NLU model associated with the second device; and
wherein the first NLU model comprises the second NLU model and the third NLU model.

6. The system of claim 3, the at least one processor executing the computer-executable instructions to determine the speechlet data by executing instructions to:
send at least one command to present a user interface to one or more of the first device or the second device;
receive from the one or more of the first device or the second device, selection data indicative of designation of the user account as obtained with the user interface; and
determine one or more data processing functions associated with the user account.

7. The system of claim 3, the at least one processor further executing the computer-executable instructions to:
determine identity data indicative of an identity of a speaker as represented by audio data;
determine the user account is associated with the identity data;
determine one or more data processing functions associated with the user account; and
designate the one or more data processing functions associated with the user account as the speechlet data.

8. The system of claim 3, the at least one processor further executing the computer-executable instructions to:
determine the one or more speechlets comprise a first speechlet that is associated with the user account;
determine the one or more speechlets comprise a second speechlet that is associated with the user account; and
wherein the speechlet data comprises the first speechlet and the second speechlet.

9. The system of claim 3, the at least one processor executing the computer-executable instructions to:
determine a dock identifier that is associated with one or more of the first device or the second device; and
the at least one processor executing the computer-executable instructions to determine the speechlet data by executing instructions to:
determine one or more data processing functions that are associated with the dock identifier, wherein the speechlet data comprises information indicative of availability of the one or more data processing functions.

10. The system of claim 3, the at least one processor further executing the computer-executable instructions to:
determine the one or more speechlets comprise a first speechlet available to the first device and a second speechlet available to the second device;
determine first data indicative of first content available to the user account by using the first speechlet;
determine second data indicative of second content available to the user account by using the second speechlet;
select the first content based at least in part on the first data and the second data;

determine data processing functions that are accessible to the user account; and designate the data processing functions that are accessible to the user account as the speechlet data.

11. The system of claim 3, the at least one processor further executing the computer-executable instructions to:
receive image data from the one or more of the first device or the second device;
determine a count of people represented in the image data;
determine the count exceeds a threshold value; and
responsive to the count exceeding the threshold value, the at least one processor further executing the computer-executable instructions to determine the speechlet data by executing instructions to:
determine the one or more speechlets comprise a first speechlet that is available to the first device;
determine the one or more speechlets comprise a second speechlet that is available to the first device; and
wherein the speechlet data comprises the first speechlet and the second speechlet.

12. The system of claim 3, wherein each intent of the set of possible intents is associated with a confidence value; and further wherein the rank of the set of possible intents is based on the confidence value for each of the intents in the set of possible intents.

13. A method comprising:
determining a first device is associated with a user account;
determining a second device is associated with the user account;
determining a third device that is associated with the first device;
determining speechlet data that is indicative of one or more data processing functions available to the first device and the second device to process one or more intents;
determining an output capability that is indicative of a type of output that the third device is able to present;
receiving first data from one or more of the first device or the second device;
processing the first data using one or more natural language understanding (NLU) models to determine a set of possible intents that are representative of intended actions as expressed in the first data that are available to the one or more data processing functions indicated by the speechlet data;
based at least in part on the output capability and from the set of possible intents, determining a first ranked intent associated with performing an intended action; and
generating command data corresponding to the first ranked intent.

14. The method of claim 13, further comprising:
receiving user input indicative of the user account; and
determining information indicative of one or more data processing functions that are associated with the user account.

15. The method of claim 13, further comprising:
determining identity data indicative of an identity of a speaker as represented by the first data;
determining the user account is associated with the identity data; and
determining information indicative of one or more data processing functions that are associated with the user account.

16. The method of claim 13, further comprising:
determining the one or more data processing functions comprise a first speechlet that is available to the first device; and
determining the one or more data processing functions comprise a second speechlet that is available to the second device.

17. The method of claim 13, further comprising:
determining a dock identifier that is indicative of a dock device; and
determining one or more data processing functions that are associated with the dock identifier; and
wherein the speechlet data is indicative of the one or more data processing functions that are associated with the dock identifier.

18. The method of claim 13, further comprising:
determining first content data indicative of first content available to the first device;
determining second content data indicative of second content available to the second device;
selecting the first content based at least in part on the first content data and the second content data; and
wherein the speechlet data is indicative of one or more data processing functions that are accessible to the user account.

19. The method of claim 13, further comprising:
sending the command data to a computing device associated with the one or more data processing functions;
performing the one or more data processing functions; and
presenting output using the one or more of the first device or the second device.

20. The method of claim 13, further comprising:
determining a second natural language understanding (NLU) model associated with the first device;
determining a third NLU model associated with the second device; and
wherein the NLU model comprises the second NLU model and the third NLU model.

21. The method of claim 13, wherein each intent of the set of possible intents is associated with a confidence value; and further wherein a rank of the set of possible intents is based on the confidence value for each of the intents in the set of possible intents.

* * * * *